(12) United States Patent
Molter

(10) Patent No.: US 8,746,642 B2
(45) Date of Patent: Jun. 10, 2014

(54) MOUNTING SYSTEM FOR USE WITH AUDIO/VISUAL DEVICES OR THE LIKE

(75) Inventor: Daniel E. Molter, Elmhurst, IL (US)

(73) Assignee: Peerless Industries, Inc., Aurora, IL (US)

( * ) Notice: Subject to any disclaimer, the term of this patent is extended or adjusted under 35 U.S.C. 154(b) by 129 days.

(21) Appl. No.: 13/397,506

(22) Filed: Feb. 15, 2012

(65) Prior Publication Data

US 2013/0206943 A1 Aug. 15, 2013

(51) Int. Cl.
*E04G 3/00* (2006.01)

(52) U.S. Cl.
USPC ............... 248/299.1; 248/284.1; 248/292.14; 248/923

(58) Field of Classification Search
USPC ............ 248/299.1, 276.1, 284.1, 292.14, 923
See application file for complete search history.

(56) References Cited

U.S. PATENT DOCUMENTS

| | | | | |
|---|---|---|---|---|
| 3,292,902 A * | 12/1966 | Lynch | | 254/122 |
| 3,782,713 A * | 1/1974 | Yount | | 269/297 |
| 3,968,949 A * | 7/1976 | Romano, Jr. | | 248/650 |
| 4,025,053 A * | 5/1977 | Stickle, Jr. | | 254/122 |
| 4,403,380 A * | 9/1983 | Hazelett et al. | | 27/12 |
| 4,527,766 A * | 7/1985 | Krenz | | 248/371 |
| 6,402,109 B1 * | 6/2002 | Dittmer | | 248/284.1 |
| 6,554,242 B2 * | 4/2003 | Kim | | 248/371 |
| D474,698 S | 5/2003 | Parmigiani | | |
| 6,604,722 B1 * | 8/2003 | Tan | | 248/276.1 |
| D486,678 S | 2/2004 | Hightower | | |
| D497,537 S | 10/2004 | O'Keene et al. | | |
| 6,905,101 B1 | 6/2005 | Dittmer | | |
| 6,964,399 B1 * | 11/2005 | O'Neill | | 248/292.13 |
| 7,090,182 B2 * | 8/2006 | O'Neill | | 248/289.11 |
| D530,595 S | 10/2006 | Lam | | |
| 7,175,146 B2 * | 2/2007 | Kim | | 248/279.1 |
| 7,178,775 B2 | 2/2007 | Pfister et al. | | |
| D538,141 S | 3/2007 | Stenhouse et al. | | |
| D538,632 S | 3/2007 | Ly Hau et al. | | |
| D539,125 S | 3/2007 | Ly Hau et al. | | |
| D553,125 S | 10/2007 | Ly Hau et al. | | |
| D553,483 S | 10/2007 | Grey | | |
| 7,316,379 B1 | 1/2008 | Graham | | |
| D563,416 S | 3/2008 | Bremmon | | |

(Continued)

OTHER PUBLICATIONS

"Peerless Audio/Visual Mounting Solutions 2009 Fall/Winter Product Catalog," Peerless industries, Inc. 2009, pp. 6-8, 13-20, and 24-33.

(Continued)

*Primary Examiner* — Terrell McKinnon
*Assistant Examiner* — Daniel J Breslin
(74) *Attorney, Agent, or Firm* — Foley & Lardner LLP

(57) ABSTRACT

A mounting system for attaching an audio/visual device to a surface via a surface mounting member. The mounting system includes a support attachment bracket configured to operatively connect to the surface mounting member, a display mounting bracket configured to operatively connect to the audio/visual device, an adjustment mechanism configured to adjust a position of the display mounting bracket relative to the support attachment bracket between a collapsed position and a tilted position, and a locking feature configured to selectively engage a post for retaining the mounting system in the collapsed position. The locking feature is disposed on one of the support attachment bracket, the display mounting bracket, and the adjustment mechanism. The post is disposed on another of the support attachment bracket, the display mounting bracket, and the adjustment mechanism.

12 Claims, 14 Drawing Sheets

(56) References Cited

U.S. PATENT DOCUMENTS

| | | | |
|---|---|---|---|
| D565,054 S | 3/2008 | Anderson et al. | |
| D570,355 S | 6/2008 | Muday et al. | |
| D574,386 S | 8/2008 | Bailo | |
| D574,698 S | 8/2008 | Grey et al. | |
| 7,438,269 B2 | 10/2008 | Pfister et al. | |
| 7,445,187 B2 * | 11/2008 | Shin | 248/324 |
| D586,338 S | 2/2009 | Stenhouse et al. | |
| D593,080 S | 5/2009 | Russell et al. | |
| 7,537,189 B2 * | 5/2009 | Jung et al. | 248/298.1 |
| D595,702 S | 7/2009 | Bremmon et al. | |
| D614,611 S | 4/2010 | Leung | |
| D614,896 S | 5/2010 | Stifal | |
| 7,722,002 B2 | 5/2010 | O'Keene et al. | |
| 7,731,143 B2 * | 6/2010 | Muday et al. | 248/284.1 |
| 7,780,131 B2 * | 8/2010 | Oh | 248/276.1 |
| D625,300 S | 10/2010 | Stifal et al. | |
| 7,823,850 B1 | 11/2010 | Lam et al. | |
| D628,459 S | 12/2010 | Minkley et al. | |
| 7,854,415 B2 | 12/2010 | Holbrook et al. | |
| 7,891,622 B1 | 2/2011 | O'Keene | |
| D633,505 S | 3/2011 | van Alphen et al. | |
| D634,311 S * | 3/2011 | Stifal et al. | D14/239 |
| D635,130 S | 3/2011 | Skull et al. | |
| D640,674 S | 6/2011 | van Alphen | |
| 7,963,489 B2 | 6/2011 | O'Keene et al. | |
| D643,421 S | 8/2011 | Russell et al. | |
| D659,689 S * | 5/2012 | Molter | D14/239 |
| D659,698 S * | 5/2012 | Molter | D14/451 |
| 8,262,044 B2 * | 9/2012 | Luijben et al. | 248/276.1 |
| 2002/0033436 A1 * | 3/2002 | Peng et al. | 248/284.1 |
| 2002/0179801 A1 * | 12/2002 | Kim | 248/441.1 |
| 2005/0061937 A1 * | 3/2005 | Kim | 248/274.1 |
| 2006/0065800 A1 | 3/2006 | Bremmon | |
| 2006/0291152 A1 | 12/2006 | Bremmon | |
| 2007/0007413 A1 * | 1/2007 | Jung et al. | 248/284.1 |
| 2007/0023599 A1 * | 2/2007 | Fedewa | 248/284.1 |
| 2007/0262215 A1 | 11/2007 | Tan | |
| 2008/0308697 A1 * | 12/2008 | Woods et al. | 248/231.91 |
| 2008/0315049 A1 | 12/2008 | Bailo et al. | |
| 2010/0171013 A1 | 7/2010 | Anderson et al. | |
| 2010/0187385 A1 * | 7/2010 | Luijben et al. | 248/205.1 |
| 2010/0207006 A1 | 8/2010 | Kim | |
| 2010/0219315 A1 * | 9/2010 | Muday et al. | 248/284.1 |
| 2010/0309615 A1 | 12/2010 | Grey et al. | |

OTHER PUBLICATIONS

U.S. Appl. No. 29/393,536, filed Jun. 6, 2011, Daniel E. Molter.
U.S. Appl. No. 29/393,535, filed Jun. 6, 2011, Daniel E. Molter.

* cited by examiner

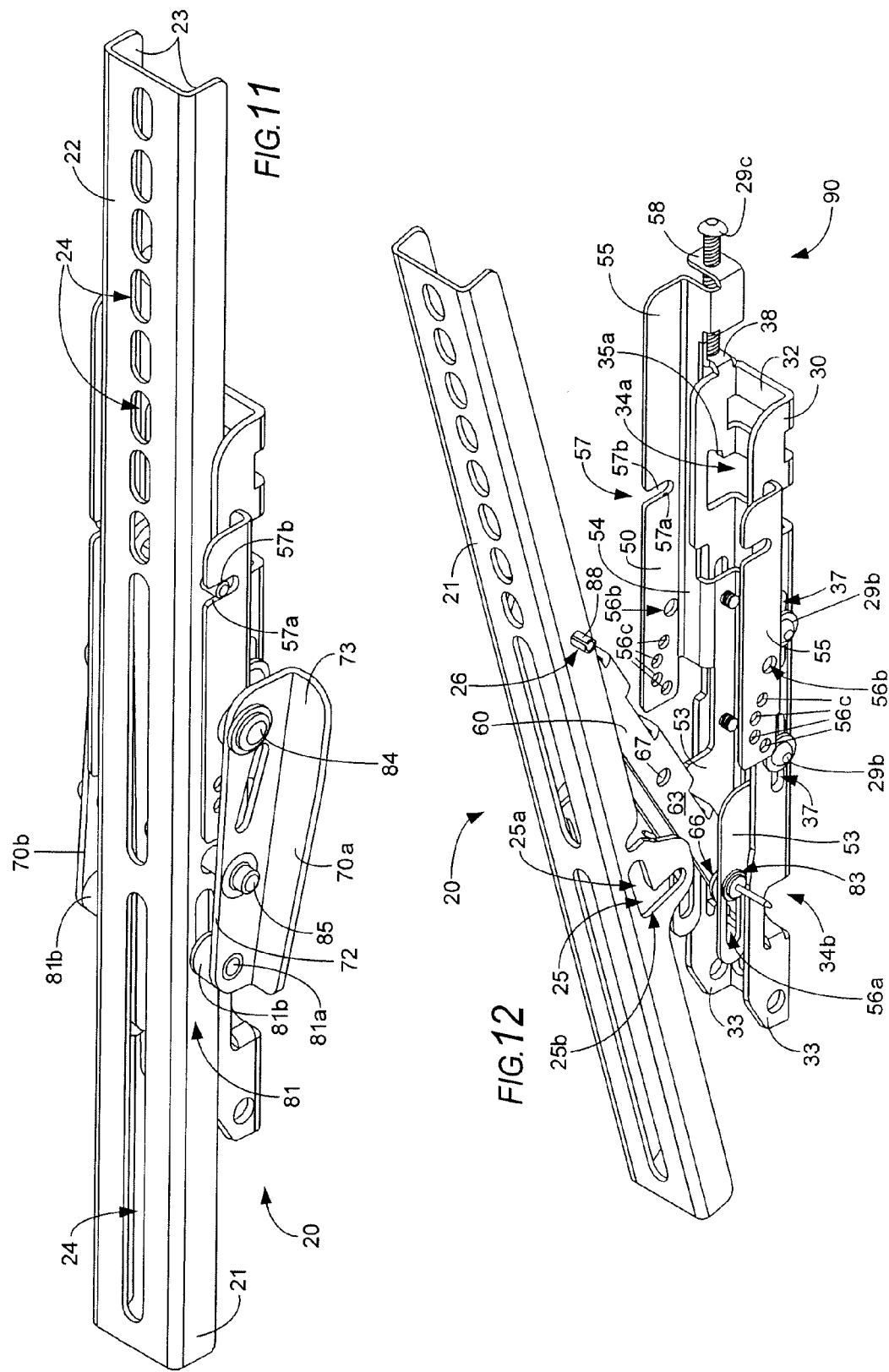

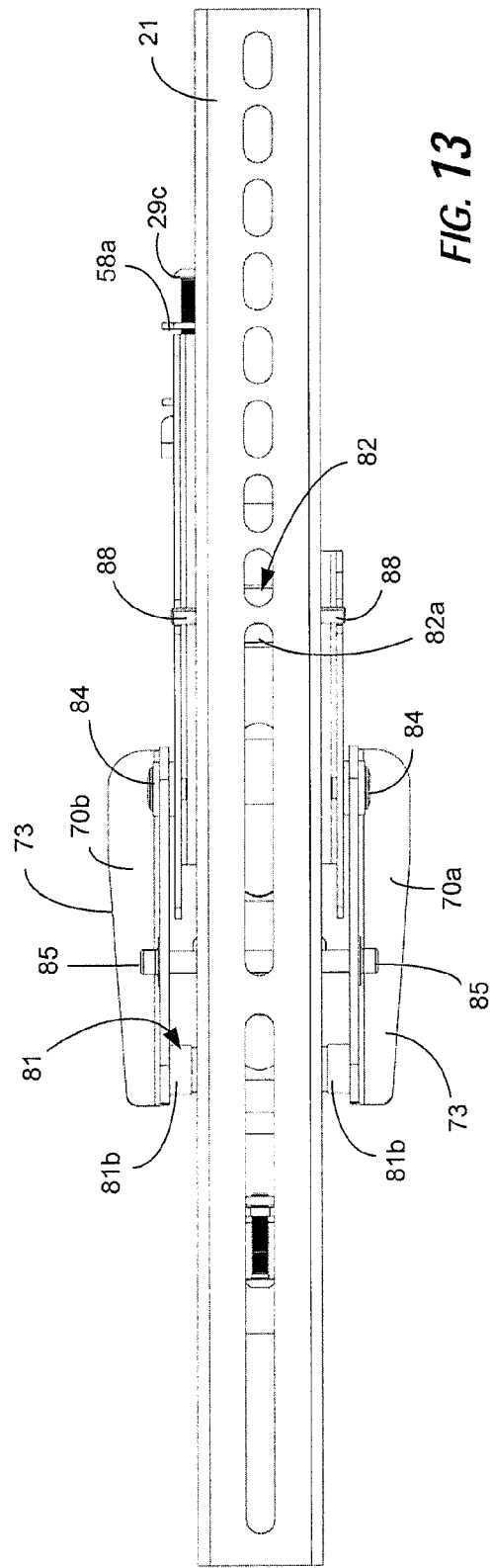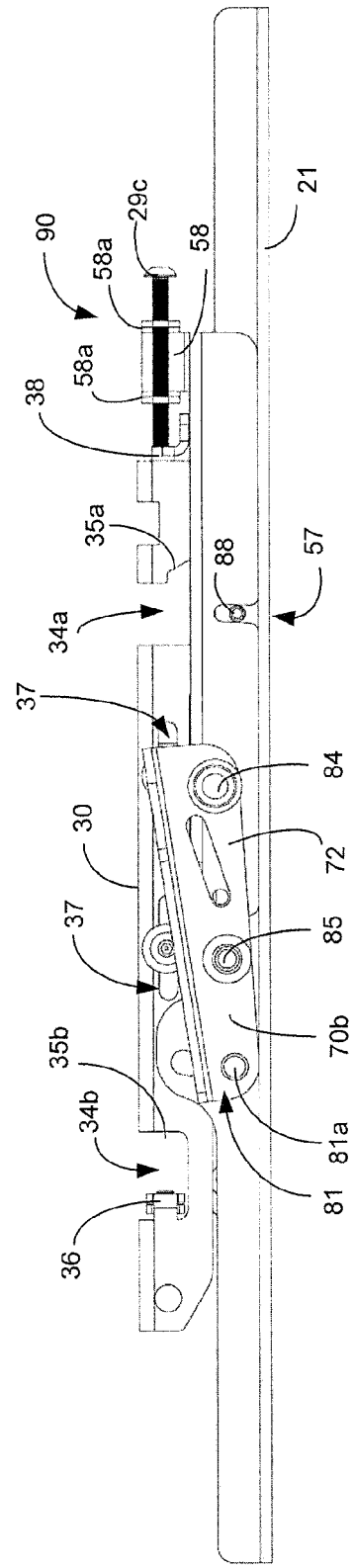

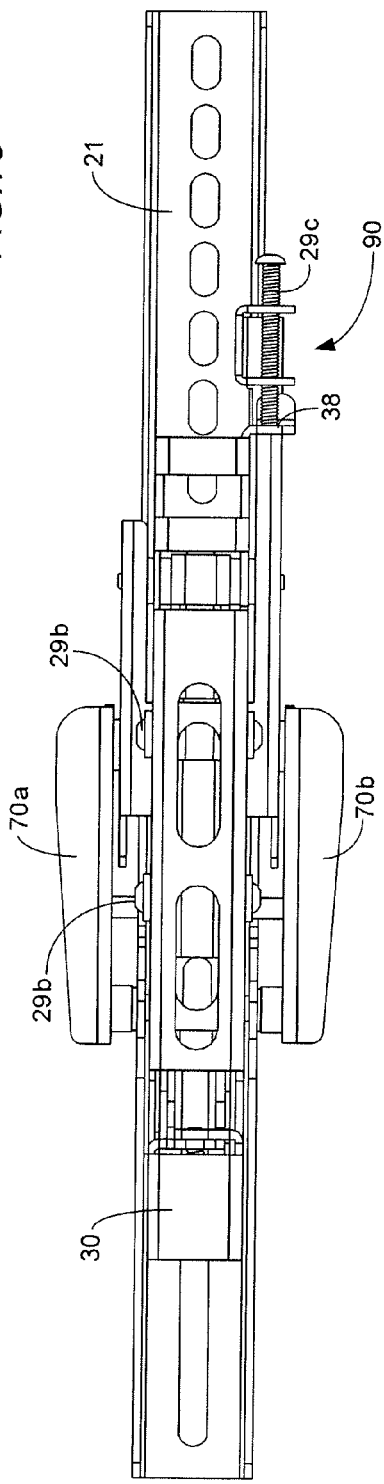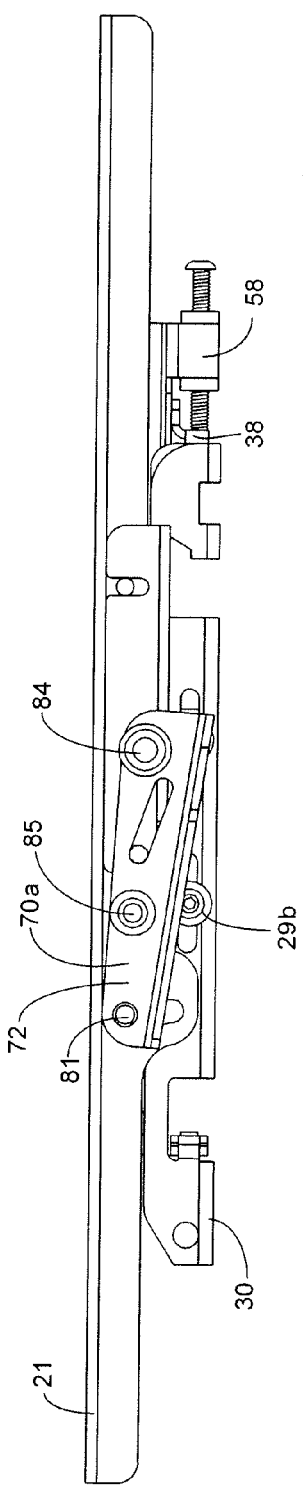

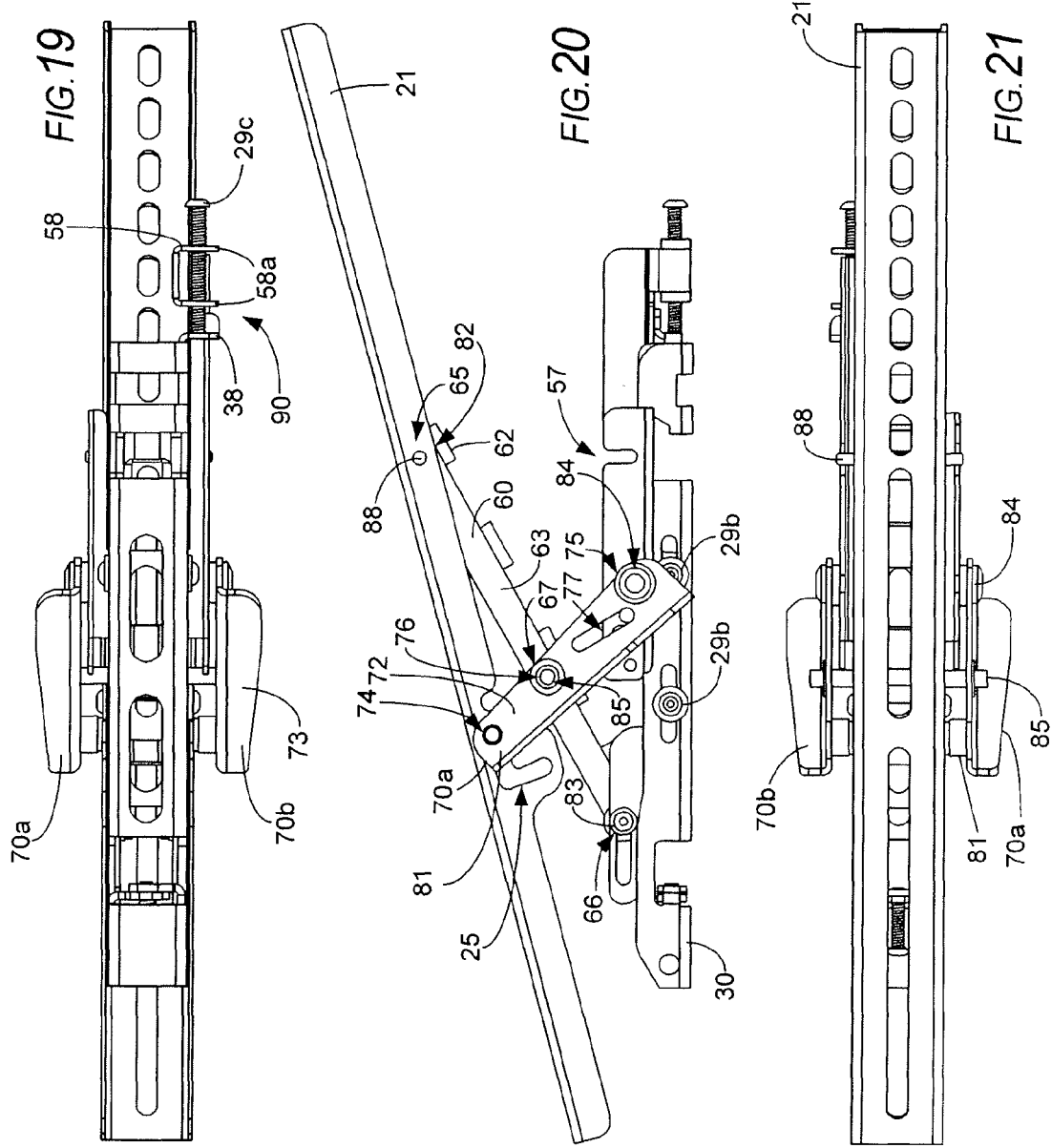

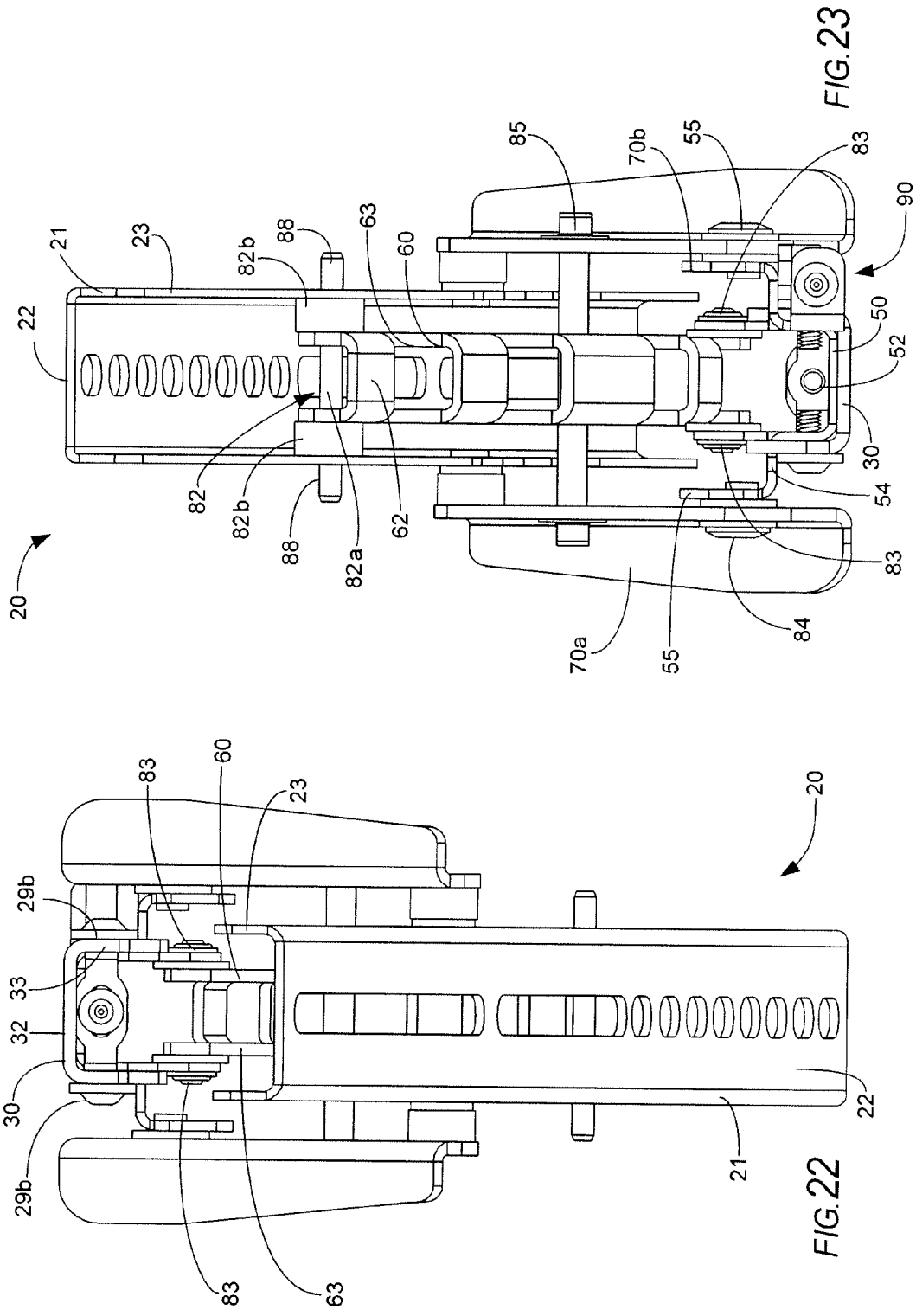

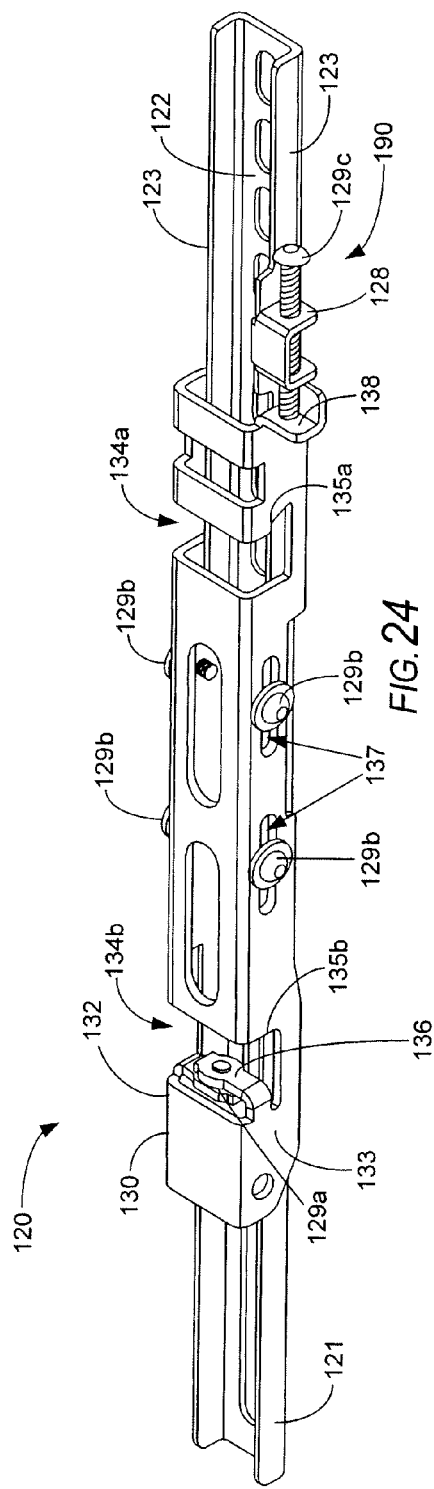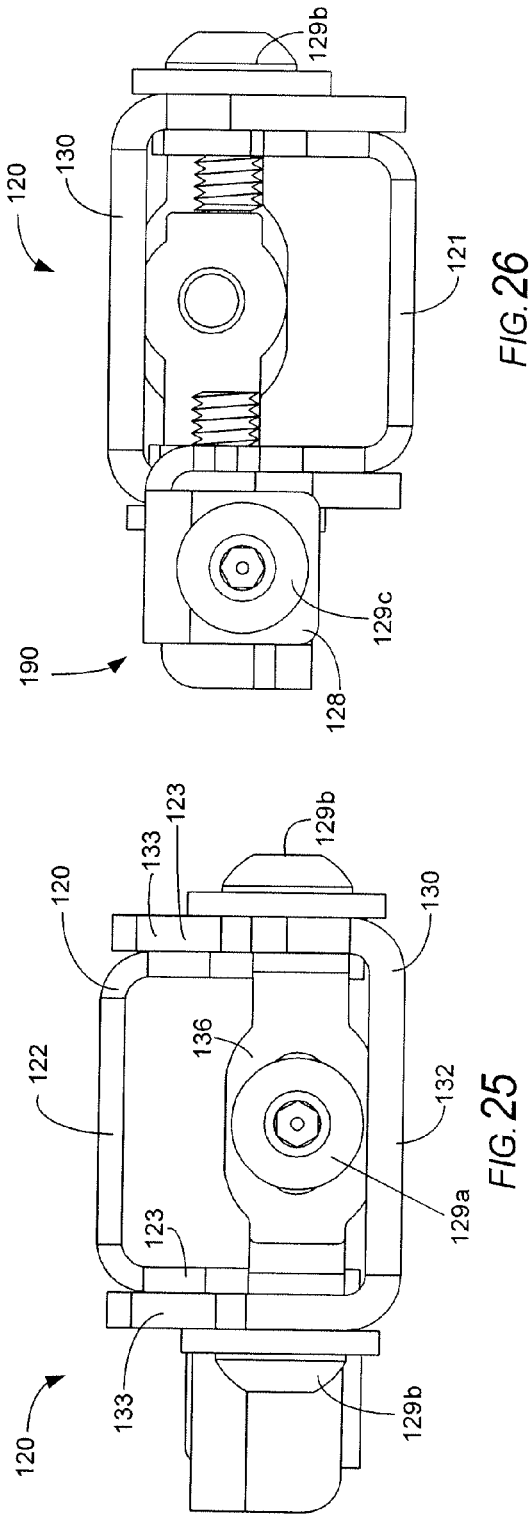

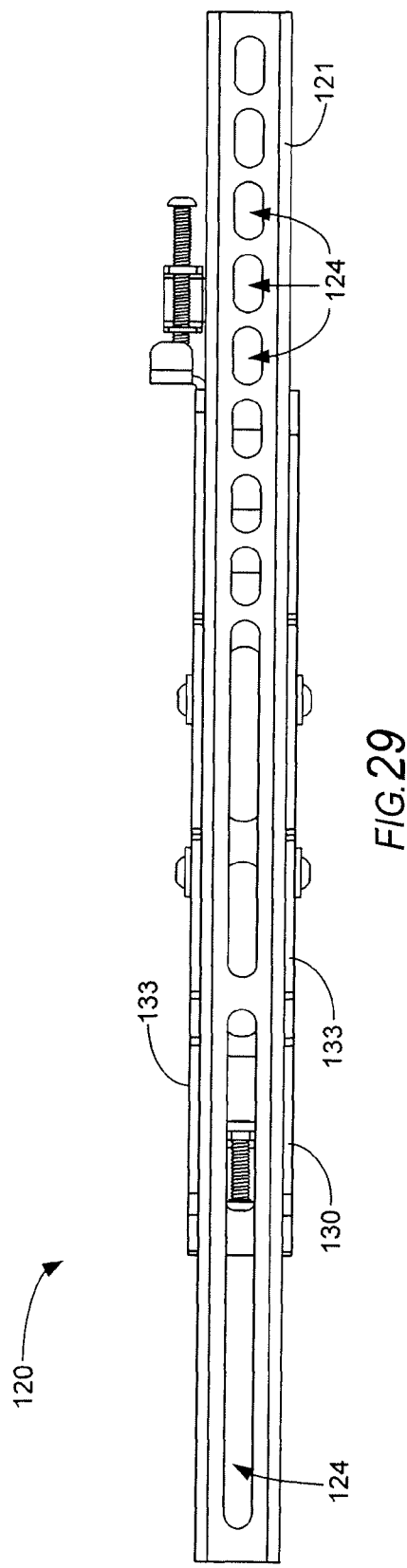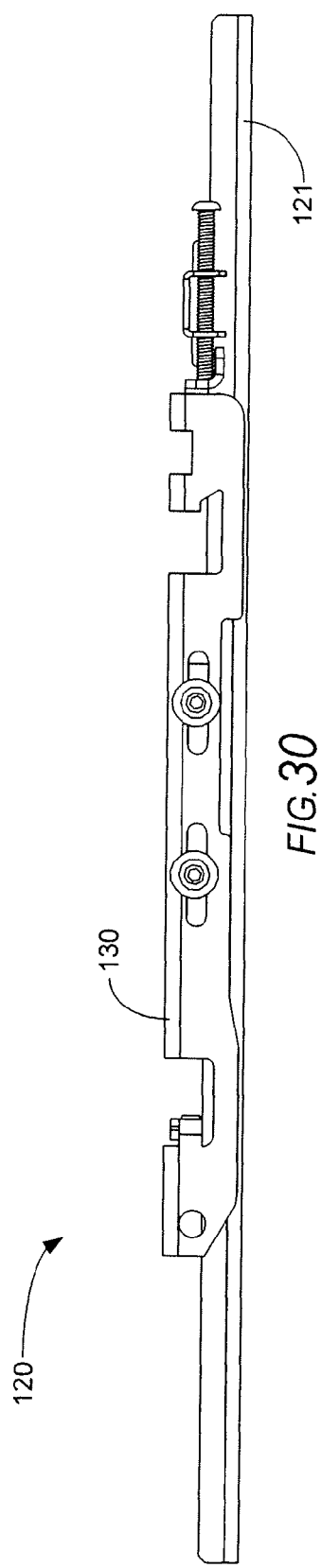
FIG. 29
FIG. 30

US 8,746,642 B2

MOUNTING SYSTEM FOR USE WITH AUDIO/VISUAL DEVICES OR THE LIKE

BACKGROUND

The present application relates generally to the field of mounting systems for audio/visual devices. More specifically, the present application relates to mounting systems including adjustment mechanisms that provide improved variable adjustability of the mounted device.

SUMMARY

One embodiment relates to a mounting system for attaching an audio/visual device to a surface of a fixing member via a surface mounting member. The mounting system comprises a support attachment bracket configured to operatively connect to the surface mounting member, a display mounting bracket configured to operatively connect to the audio/visual device, and an adjustment mechanism configured to adjust a position of the display mounting bracket relative to the support attachment bracket between a collapsed position and a tilted position. The adjustment mechanism includes a locking feature, wherein the locking feature is configured to selectively engage a post for retaining the mounting system in the collapsed position. The locking feature may be disposed on one of the support attachment bracket, the display mounting bracket, or the adjustment mechanism, and the post may be disposed on another of the support attachment bracket, the display mounting bracket, and the adjustment mechanism.

Another embodiment relates to a mounting system for attaching an audio/visual device to a surface of a fixing member via a surface mounting member. The mounting system includes a support attachment bracket configured to operatively connect to the surface mounting member, a display mounting bracket configured to operatively connect to the audio/visual device, and an adjustment mechanism operatively connecting the display mounting bracket and the support attachment bracket. The adjustment mechanism may be configured to articulate the display mounting bracket relative to the support attachment bracket through a pivot member. One of the display mounting bracket and the adjustment mechanism includes a guide feature that is movably coupled to the pivot member, and the other of the display mounting bracket and the adjustment mechanism is pivotally coupled to the pivot member. The guide feature includes a first leg that may be configured to, allow for forward tilt of the display mounting bracket relative to the support attachment bracket when the pivot member engages the first leg. The guide feature further includes a second leg that may be configured to allow for rearward tilt of the display mounting bracket relative to the support attachment bracket when the pivot member engages the second leg.

Yet another embodiment relates to a mounting system, for attaching an audio/visual device to a surface of a fixing member via a surface mounting member. The mounting system includes a support attachment bracket configured to operatively connect to the surface mounting member, a display mounting bracket configured to slide or otherwise shift relative to the support attachment bracket, the display mounting bracket configured to operatively connect to the audio/visual device, and an adjustment assembly. The adjustment assembly includes an adjustment member, a retaining member having configured to pivotally support the adjustment member, and a contact member having an external surface configured to be contacted by the adjustment member. Rotation of the adjustment member relative to the retaining member when the adjustment member contacts the external surface moves the contact member relative to the retaining member and shifts the display mounting bracket relative to the support attachment bracket.

BRIEF DESCRIPTION OF THE DRAWINGS

FIG. 11 is a perspective view of an exemplary embodiment of a device mount shown in the collapsed position.

FIG. 12 is a perspective view of the device mount of FIG. 11 shown in an articulated position with the outer bracket removed for clarity.

FIG. 13 is a front view of the device mount of FIG. 11.
FIG. 14 is a left-side view of the device mount of FIG. 11.
FIG. 15 is a rear view of the device mount of FIG. 11.
FIG. 16 is a right-side view of the device mount of FIG. 11.
FIG. 19 is a rear view of the device mount of FIG. 12.
FIG. 20 is a right-side view of the device mount of FIG. 12.
FIG. 21 is a front view of the device mount of FIG. 12.
FIG. 22 is a bottom view of the device mount of FIG. 12.
FIG. 23 is a top view of the device mount of FIG. 12.
FIG. 24 is a perspective view of another exemplary embodiment of a device mount that is configured to provide linear adjustment.
FIG. 25 is a bottom view of the device mount of FIG. 24.
FIG. 26 is a top view of the device mount of FIG. 24.
FIG. 29 is a front view of the device mount of FIG. 24.
FIG. 30 is a left-side view of the device mount of FIG. 24.

DETAILED DESCRIPTION

With general reference to the Figures, disclosed in the present application are various embodiments of device mounts that are configured to provide support and adjustability to a device, such as a display device. The device mounts include adjustment mechanisms that provide variable adjustment or articulation (e.g., tilt, linear travel) of the mounted device (e.g., display device) mounted relative to a fixing member or support, such as a wall, in which the device mount is attached thereto. The adjustment mechanisms allow the mounted devices to pivot about one or more pivot axes to provide variable adjustment of the relative position of the mounted device, such as for a customer to reposition the display device to improve visibility thereof. The device mount may include an adjustment, mechanism that is configured to provide both forward and rearward tilt of the mounted device through movement of the adjustment mechanism along an L-shaped slot, where a first portion (e.g., base) of the L-shaped slot allows for the rearward tilt and a second portion (e.g., arm) of the L-shaped slot allows for the forward tilt. The device mount may include a locking mechanism that operates to lock to the adjustment mechanism in one or more than one position (e.g., a collapsed position, an adjusted position), such as by providing a biasing force that helps maintain the position of the adjustment mechanism. The device mount may include a fine adjustment assembly that is configured to provide relative shifting (e.g., linear travel, arcuate travel, etc.) between a display mounting bracket and a support attachment bracket, such as to allow for leveling of a device mount relative to another device mount where the mounting system includes more than one device mount.

Figure 1:
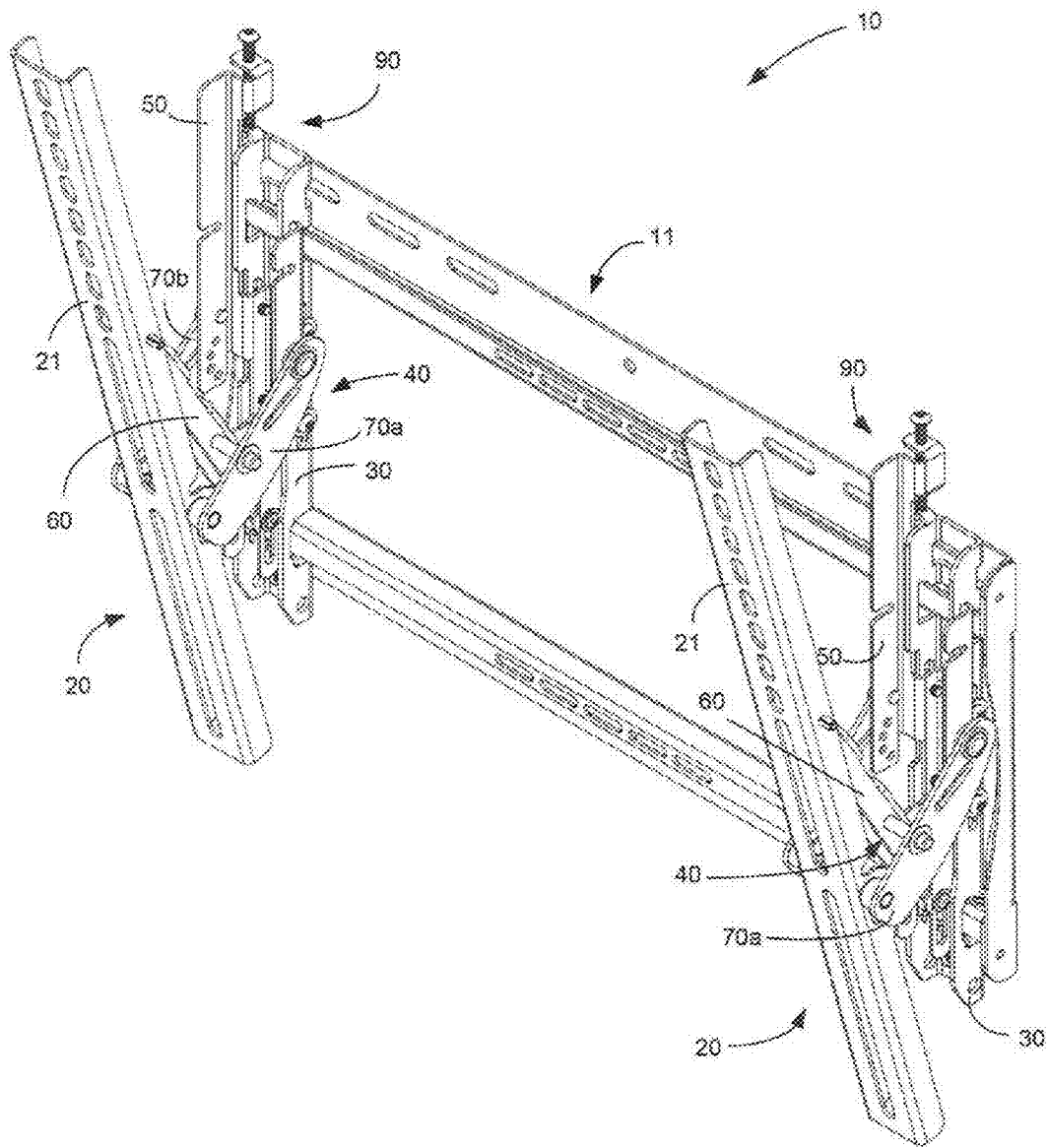
FIG. 1 is a perspective view of an exemplary embodiment of a mounting assembly.

FIG. 1 illustrates an exemplary embodiment of a mounting assembly 10 that is configured to provide the variable adjustment or articulation (e.g., tilt, linear travel) of a coupled device, such as a flat screen, display device, relative to a fixing member, such as a wall or another supporting object. As shown, the mounting assembly 10 includes a surface mounting member 11 (e.g., a surface mounting bracket) and a pair of device mounts 20 coupled or otherwise operatively connected to the surface mounting member 11. The surface mounting member 11 secures the mounting assembly 10 to a fixing member, such as a wall, through any suitable coupling method (e.g., conventional fasteners), while the device mounts 20 provide for adjustment of the display device coupled thereto through articulation and/or tilting of the device mounts 20. The adjustment of the display device relative to the fixing member allows the customer to advantageously position the display device for a preferred viewing orientation.

Figure 2:
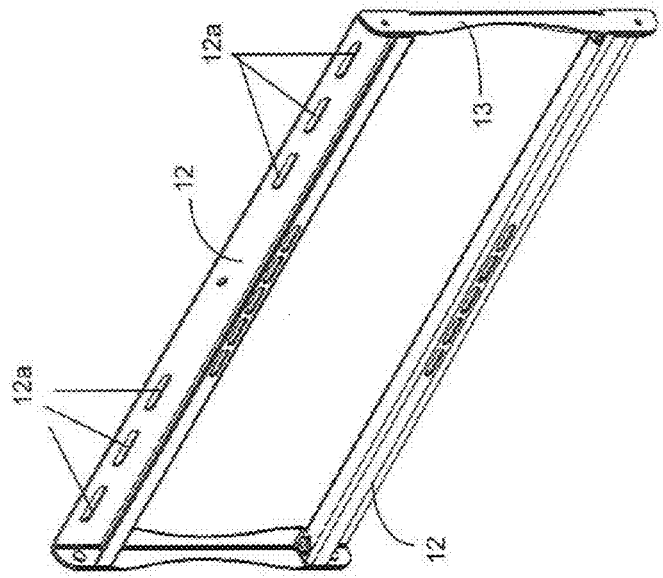
FIG. 2 is a perspective view of an exemplary embodiment of a surface mounting member for use in the mounting assembly of FIG. 1.

As shown in FIG. 2, the surface mounting member 11 includes a pair of spaced-apart cross members 12 coupled to a pair of spaced-apart vertical members 13 to thereby form a substantially rectangular shaped frame structure, where the surface mounting member 11 has a surface that is configured to abut the fixing member. Each pair of members (e.g., the cross members 12, the vertical members 13) may be similar in shape, may be symmetrically opposite in shape, or may be shaped differently. The cross members 12 and vertical members 13 may be coupled together through fasteners, welding, a combination thereof, or any suitable method. It should be noted that the surface mounting member 11 may be configured differently than as disclosed herein, and may include one or any number of members or brackets, which may be integrally formed together or separately formed then coupled together, and the examples disclosed herein are not meant as limitations.

Figure 3:
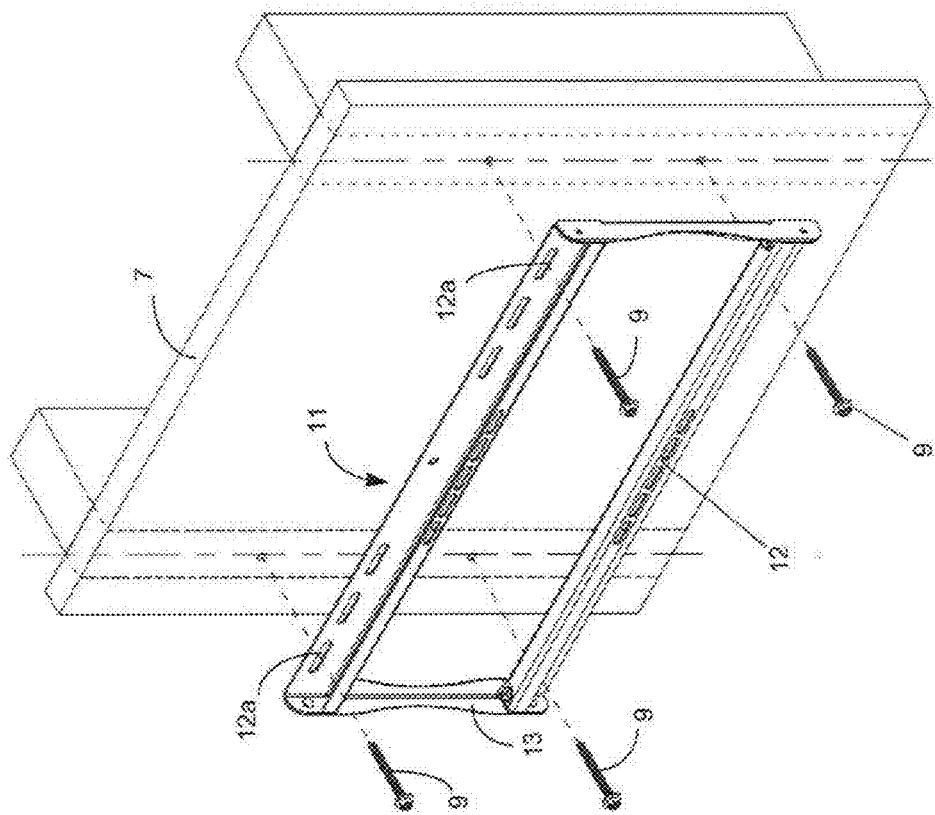
FIG. 3 is an exploded perspective view of the surface mounting member of FIG. 2 being coupled to a wall.

Each cross member 12 and vertical member 13 may be configured to mount to a fixing member, such as by including one or more slots that are configured to receive fasteners 9 (e.g., bolts, screws, etc.) for coupling the surface mounting member 11 to the fixing member. As shown in FIG. 3, each cross member 12 includes a plurality of horizontally extending slots 12a configured to receive a bolt 9 to mount (e.g., couple) the surface mounting member 11 to a wall 7. The plurality of slots 12a allow the surface mounting member 11 to be operatively connected at varying widths to walls having varying configurations. It should be noted that the number of fasteners used to mount the surface mounting member 11 to the wall 7 may be varied, such as to accommodate varying weight display devices or varying strength walls.

Figure 5:
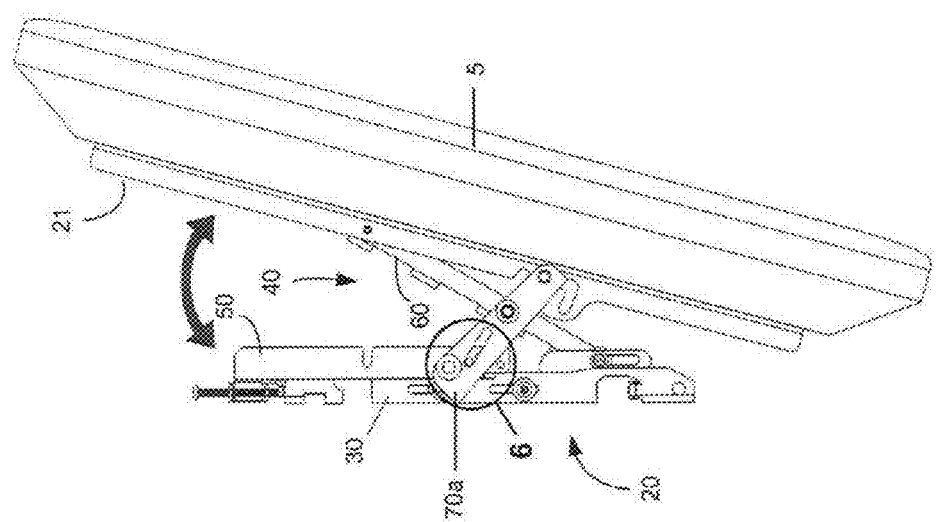
FIG. 5 is a side view of the coupled device mount and display device of FIG. 4 being coupled to the surface mounting member of FIG. 2.
Figure 7:
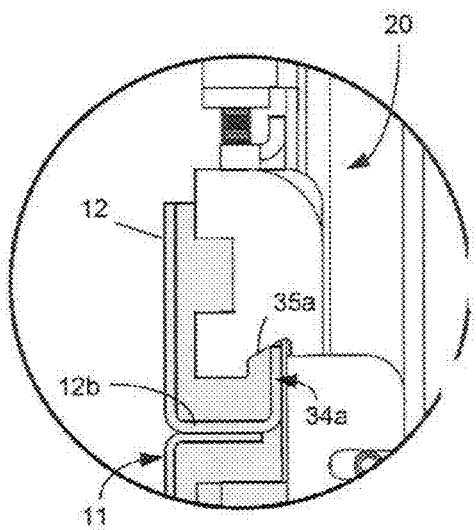
FIG. 7 is a detail view of the device mount of FIG. 5 showing the device mount engaging the surface mounting member.
Figure 8:
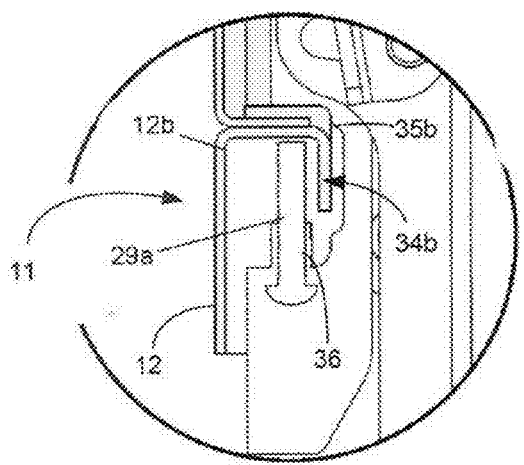
FIG. 8 is another detail view of the device mount of FIG. 5 showing the device mount engaging the surface mounting member.

The surface mounting member 11 includes features that allow the device mounts 20 to be operatively connected thereto. As shown in FIGS. 5, 7, and 8, each cross member 12 includes an receiving feature 12b that is configured to receive a corresponding engaging feature of the device mount 20. As shown, the receiving feature 12b of the cross member 12 comprises a J-shaped channel, where the receiving feature 12b extends the length (e.g., the distance) between the pair of vertical members 13 to allow the device mount 20 to be coupled to the cross member 12 at any location along the length of the receiving feature 12b. It should be noted that the engaging feature of the cross member may have a different shape (e.g., a C-shape, L-shape, etc.) and/or a different length, and the engaging features disclosed herein are not meant as limitations.

Figure 10:
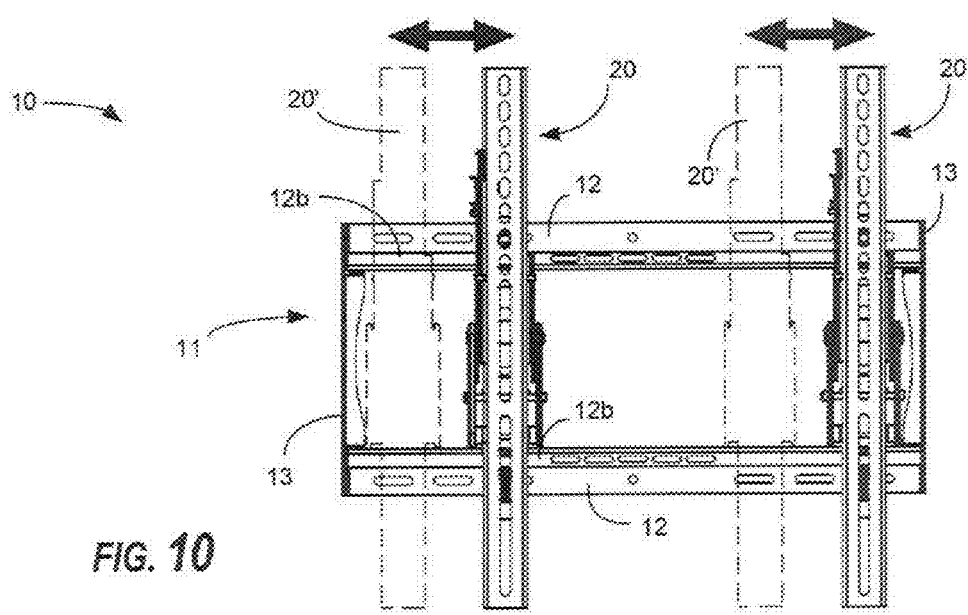
FIG. 10 is a front view of the mounting assembly of FIG. 1, showing the lateral adjustment of the device mounts relative to the surface mounting member.
Figure 17:
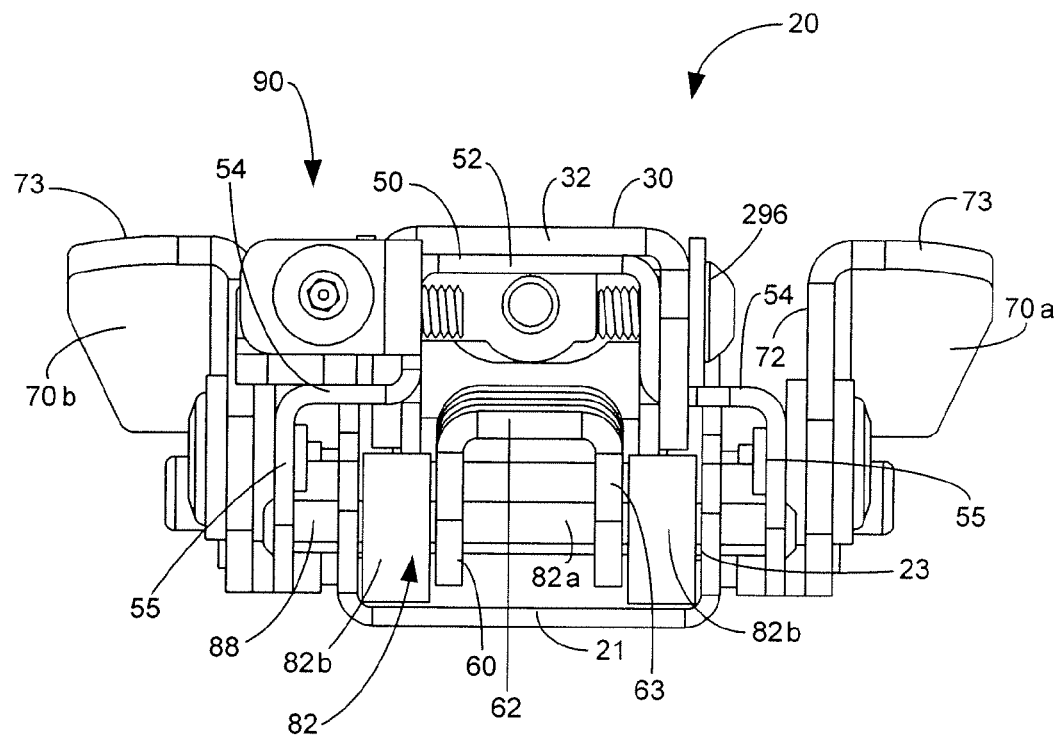
FIG. 17 is a top view of the device mount of FIG. 11.
Figure 18:
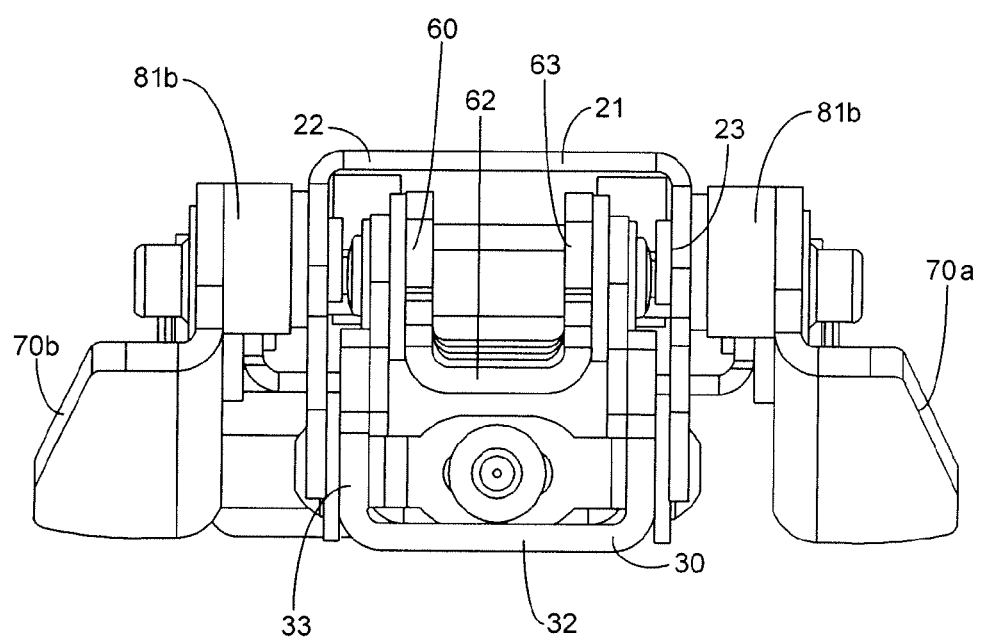
FIG. 18 is a bottom view of the device mount of FIG. 11.
Figure 27:
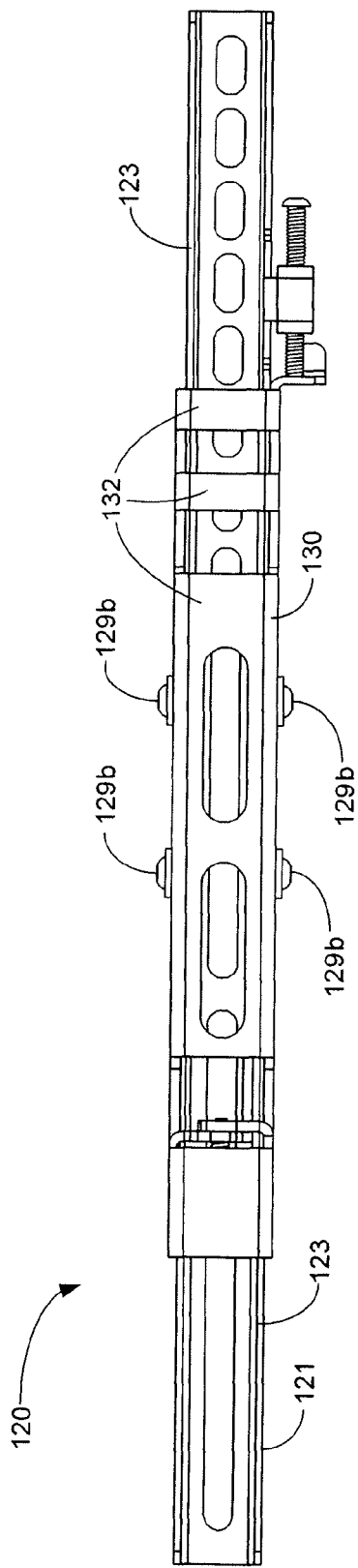
FIG. 27 is a rear view of the device mount of FIG. 24.
Figure 28:
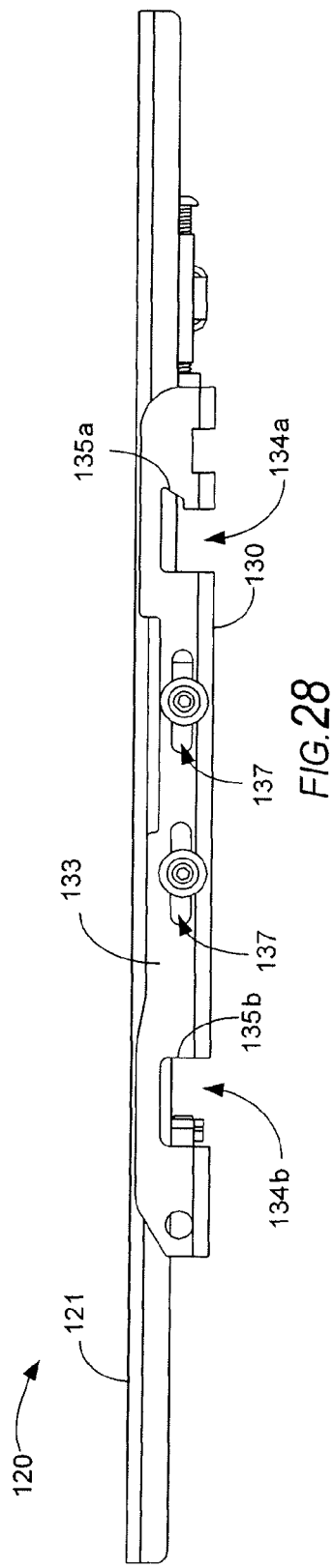
FIG. 28 is a right-side view of the device mount of FIG. 24.

Also shown in FIGS. 5, 7, and 8, the device mount 20 is coupled to the surface mounting member 11 through a pair of engaging features, where one of the engaging features of the device mount 20 engages a corresponding receiving feature 12b on each of the pair of cross members 12. The device mounts 20 being configured to be coupled to the surface mounting member 11 at any location along the length of the receiving feature 12b of the cross member 12 allows the mounting assembly 10 to accommodate varying width display devices, since the spacing (e.g., distance) between the device mounts 20 may be varied along the surface mounting member 11. As shown in FIG. 10, the device mounts 20 may be moved laterally along the cross members 12 to other possible locations, such as those locations represented by device mounts 20' (shown as dashed lines). Thus, the spacing between the two device mounts 20 may be held constant, while the two device mounts 20 are moved (e.g., slid) laterally relative to the surface mounting member 11 (e.g., the cross members 12 and receiving feature 12b therein), such as to move the display device laterally. Alternatively, the spacing between the device mounts 20 may be narrowed to accommodate a relative narrow display device, or the spacing between the device mounts 20 may be widened to accommodate a relative wider display device. The engaging feature of the device mount 20 is discussed below in more detail.

FIGS. 11-23 illustrate an exemplary embodiment of a device mount 20 that, is configured to provide for the variable adjustment of the display device relative to a fixing member such as a wall. For example, the device mount 20 may be configured to provide forward tilt, rearward tilt, and height adjustment of the display device 5 relative to the wall 7 through various articulations of the one or more device mounts 20. As shown, the device-mount 20 includes a first or display mounting bracket 21, a second or support attachment bracket 30, and an adjustment or articulation mechanism 40. The adjustment mechanism 40 provides for adjustment (e.g., articulation and tilt) of the display mounting bracket 21 relative to the support attachment bracket 30. Accordingly, the adjustment mechanism 40 is disposed between and operatively coupled to the display mounting bracket 21 and the support attachment bracket 30.

Figure 4:
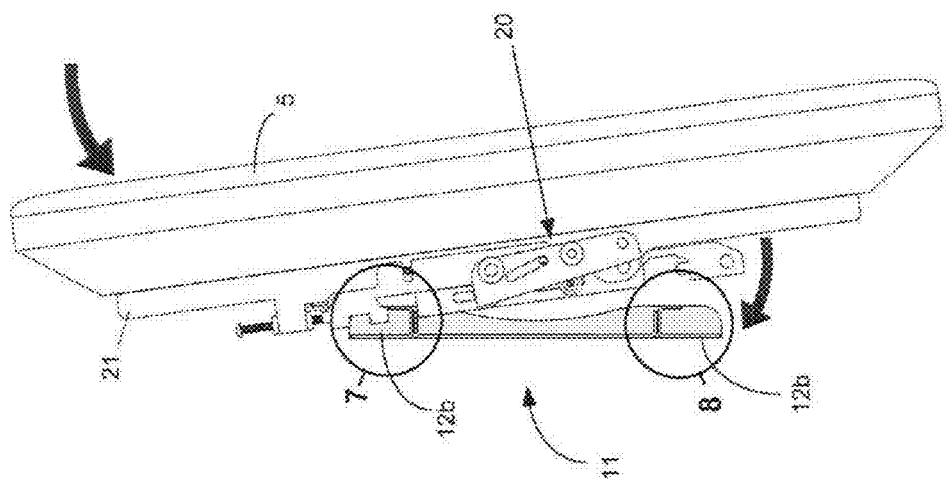
FIG. 4 is a side view of an exemplary embodiment of a device mount coupled to a display device.

According to an exemplary embodiment, the display mounting bracket 21 comprises a U-shaped channel having a base 22 and opposing legs 23 (e.g., flanges, walls) extending from the base 22. As shown in FIGS. 4 and 5, the display mounting bracket 21 (e.g., the base 22) is configured to support the display device 5 coupled thereto. Accordingly, the base. 22 of the display mounting bracket 21 includes features for coupling the display device 5 thereto. For example, FIG. 11 illustrates the base 22 having a plurality of slots 24 (e.g., apertures, holes) that are configured to receive one or more fasteners (e.g., bolts, screws, etc.) for mounting or coupling the display device 5 to the display mounting bracket 21.

The display mounting bracket 21 is configured to be coupled to the adjustment mechanism 40 and includes features for facilitating such. For example, the display mounting bracket 21 includes a guide feature that is configured to control (e.g., guide) the relative movement between the display mounting bracket 21 and the operatively coupled adjustment mechanism 40. As shown in FIG. 12, the guide feature of the display mounting bracket 21 comprises an L-shaped opening 25 (e.g., a slot or a hole) that guides the travel of a first pivot member 81 of the adjustment mechanism 40 therein. The L-shaped opening 25 advantageously cooperates with the adjustment mechanism 40 to allow forward and rearward tilt of the display mounting bracket 21 relative to the support attachment bracket 30 thereby providing forward and rearward tilt of the display device 5 relative to the wall 7. It should be noted that the guide feature may be configured differently so that something other than an opening is used.

As shown in FIG. 12, the L-shaped opening 25 includes a first leg 25a and a second leg 25b. The first leg 25a guides the travel of the first pivot member 81 when the display mounting bracket 21 articulates in a forward direction relative to the support attachment bracket 30, such as to tilt the display device forward. The second leg 25b guides the travel of the first pivot member 81 when, the display mounting bracket 21 articulates in a rearward direction relative to the support attachment bracket 30, such as to tilt the display device rearward. The length of first leg 25a of the slot 25 may be varied to vary the amount (e.g., length) of travel that the first pivot member 81 of the adjustment mechanism 40 is allowed to move, such as to vary the amount of forward tilt of the display device. Additionally, the length of the second leg 25b of the slot 25 may be varied to vary the amount of travel that the first pivot member 81 is allowed to move, such as to vary the amount of rearward tilt of the display device. According to an exemplary embodiment, the second leg 25b of the slot 25 is configured at an acute angle relative to the first leg 25a. However, it should be noted that the second leg 25b may be configured at any angle (e.g., obtuse, oblique, etc.) relative to the first leg 25a, which may be driven by the geometry of the adjusts lent mechanism 40 and the kinematics that it moves through during adjustment. The first leg 25a may extend in a direction that is substantially parallel to the base 22 or may extend at an angle (e.g., acute, obtuse, etc.) relative to the base 22.

According to an exemplary embodiment, both legs 23 of the display mounting bracket 21 include opposing and symmetric L-shaped slots 25, where each of the two L-shaped slots 25 are configured to receive a first pivot member 81, such that both first pivots members 81 are substantially concentric. The double first pivot member 81 arrangement may advantageously improve performance of the adjustment mechanism 40, for example, by loading on both sides of the adjustment mechanism 40 and display mounting bracket 21 to reduce or eliminate torque or binding that may otherwise be present during adjustment with a single pivot and single loading arrangement, such as where the pivot is offset from, a centerline where the display device attaches to the display mounting bracket 21. The double first pivot member 81 arrangement also may advantageously improve the structural integrity of the device mount 20 by being able to carry/distribute loads through both pivots, such as by reducing the shear stress in each pivot.

Also shown in FIG. 12, the display mounting bracket also includes an aperture 26 configured to receive a post 88, which extends beyond the leg 23 of the display mounting bracket 21. The post 88 is configured to engage a locking feature 57, which is discussed in greater detail below. As shown, the post 88 is integrally formed with (e.g., configured as an extension of) the second pivot member 82. However, the post 88 may be formed separately and disconnected from the second pivot-member 82. As shown in FIG. 23, the second pivot member 82 of the adjustment mechanism 40 is configured to allow the adjustment mechanism 40 to be adjusted or reconfigured about a pivot axis defined by the second pivot member 82, which is also discussed in greater detail below. The aperture 26 may be located in the leg 23 of the display mounting bracket 21. According to an exemplary embodiment, the two legs 23 of the display mounting bracket 21 include opposing and symmetric holes 26 to thereby support the second pivot member 82 in double shear while providing a concentric pivot axis across both legs 23 of the display mounting bracket 21. In other words, the display mounting bracket 21 and the second pivot member 82 may form a clevis. However, it should be noted that the display mounting bracket 21 may be configured to include one aperture 26 or a plurality of apertures. The display mounting bracket 21 may also include additional apertures, holes, slots, and/or voids, such as to receive a post 88 that is configured disconnected from the second pivot member 82.

According to an exemplary embodiment, the support attachment bracket 30 comprises a U-shaped channel having a base 32 and opposing legs 33 (e.g., flanges) extending from the base 32. As shown in FIG. 5, the support attachment bracket 30 (e.g., the base 32) is configured to operatively connect (e.g., couple, attach, engage) to the surface mounting member 11 to support the display device 5 coupled to the device mount 20. The support attachment bracket 30 includes features for coupling (e.g., engaging) the support attachment bracket 30 to the surface mounting member 11. As shown in FIGS. 11-14, the exemplary embodiment of the support attachment bracket 30 includes notches 34 that cut into the base 32 and the legs 33 of the support attachment bracket 30 that define engaging features 35 for operatively connecting to the surface mounting member 11. The first notch 34a (e.g., the top notch) includes a rectangular portion and an undercut trapezoidal portion that defines a first engaging feature 35a having a recess. The second notch 34b (e.g., the bottom notch) includes a rectangular portion that defines a second engaging feature 35b.

As shown in FIG. 7, the first notch 34a of the support attachment bracket 30 is configured to receive the receiving feature 12b (e.g., the upper receiving feature) of the surface mounting member 11, where the first engaging feature 35a has an inverted hook profile, such that the profile of the first engaging feature 35a is configured to engage and be retained by the receiving feature 12b of the surface mounting member 11. The recess of the first engaging feature 35a receives a leg of the J-shaped receiving feature 12b to thereby operatively connect the support attachment bracket 30 to the surface mounting member 11 As shown in FIG. 5, the first engaging feature 35a of the support attachment bracket 30 may be engaged with the surface mounting member 11 prior to connecting the second engaging feature 35b to the surface mounting member 11, where the device mount 20 and coupled display device 5 may then pivot about the connection between the first engaging feature 35a of the support attachment bracket 30 and the corresponding receiving feature 12b of the surface mounting member 11 until the second engaging feature 35b of the support attachment bracket 30 engages its corresponding receiving feature 12b (e.g., the lower receiving feature) of the surface mounting member 11.

As shown in FIG. 8, the second notch 34b of the support attachment bracket 30 is configured to receive or mesh with the lower receiving feature 12b of the surface mounting member 11, such that the second engaging feature 35b of the support attachment bracket 30 is engaged with the lower, receiving feature 12b. For example, the respective engaging and receiving features may have mating surface profiles, which abut one another. The device mount 20, may also include a retaining member to help maintain engagement between the second engaging feature 35b of the support attachment bracket 30 and the lower receiving feature 12b of the surface mounting member 11. In other words, the retaining member may help lock the support attachment bracket 30 to the surface mounting member 11. As shown in FIG. 8, the retaining member may include a fastener 29a (e.g., screw) in threaded engagement with a threaded ear 36 (e.g., a tab, a flange) of the support attachment bracket 30. After the engaging features of the support attachment bracket 30 and the receiving features of the surface mounting member 11 are engaged, the fastener 29a may be tightened (e.g., turned) to thereby move the end of the fastener 29a into a clamping condition with surface mounting member 11 and/or create an interference with the receiving feature 12b of the surface mounting member 11, such that the fastener 29a prohibits movement of the support attachment bracket 30 relative to the surface mounting member 11 that would disengage the respective engaging and receiving features.

The support attachment bracket 30 also includes one or more slots 37 (e.g., openings, holes) configured to allow relative movement (e.g., sliding) between the support attachment bracket 30 and the adjustment mechanism 40. As shown, each leg 33 of the support attachment bracket 30 includes two aligned slots 37, where each slot 37 receives a fastener 29b for selectively clamping the support attachment bracket 30 and a carriage bracket 50 of the adjustment mechanism 40 to prohibit relative movement between the support attachment bracket 30 and the carriage bracket 50. The two aligned slots 37 of each leg 33 may oppose two aligned slots 37 in the other leg 33 of the support attachment bracket 30. The carriage bracket 50 is described in greater detail below.

The support attachment bracket 30 may also include a contact member 38 having an external surface that is configured to be contacted or engaged by a fine adjustment assembly 90, where the device mount 20 includes such an assembly to induce relative movement between the support attachment bracket 30 and the adjustment mechanism 40, such as the carriage bracket 50 of the adjustment mechanism 40. As shown, the contact member 38 comprises a tab that extends from the end of the support attachment bracket 30, such that the contact member 38 is able to receive a fastener 29c, such as an end of the fastener 29c, of the fine adjustment assembly 90.

According to the exemplary embodiment shown, the adjustment mechanism 40 includes a carriage bracket 50 (e.g., carriage member), an inner bracket 60 (e.g., inner member), two outer brackets 70a and 70b (e.g., outer members), and a plurality of pivot members. Alternatively, the adjustment mechanism may be configured with one outer pivot member.

As shown, the carriage bracket 50 comprises an inner U-shaped channel having a base 52 and opposing first legs 53 extending from the base 52, where the inner U-shaped channel is configured to nest inside the U-shaped support attachment bracket 30. The carriage bracket 50 also includes opposing flanges 54 that extend from the legs 53 in opposite directions (e.g., outer directions) that are substantially parallel to the base 52. The carriage bracket 50 also includes second legs 55, where each second leg 55 extends from one of the flanges 54 in a direction that is substantially parallel to the first legs 53. The flanges 54 extend beyond the width of the support attachment bracket 30, such that the second legs 55 are located outboard of the support attachment bracket 30.

Figure 6:
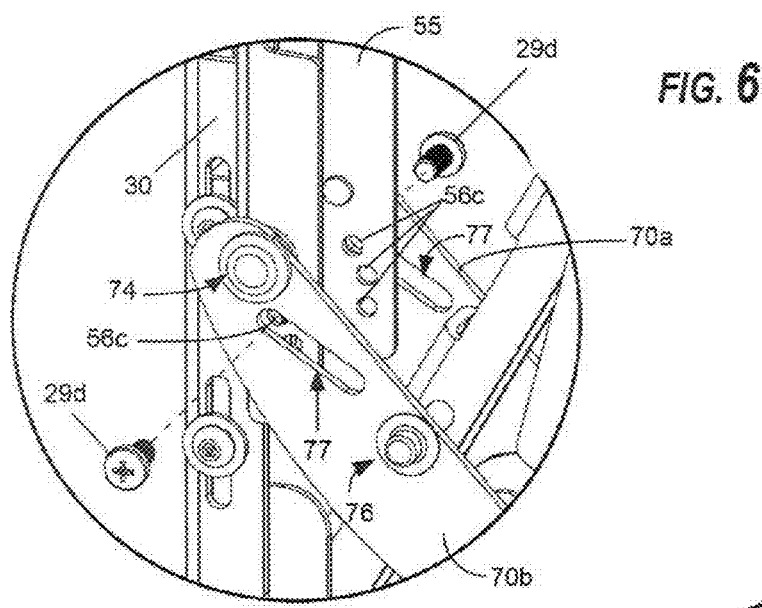
FIG. 6 is a detail view of the device mount of FIG. 4 showing the adjustment mechanism being locked in position.

The carriage bracket 50 includes various openings (e.g., apertures, holes) that provide various functions. The carriage bracket 50 includes opposing and symmetric first openings 56a (e.g., first holes) disposed in the first legs 53, where the first openings 56a are configured as slots to allow third pivot members 83 to travel therein during adjustment of the device mount 20. The length of the first openings 56a may be varied, such as to provide for varying amounts (e.g., distances) of travel of the third pivot members 83. The carriage bracket 50 includes opposing and symmetric second openings 56b disposed in the second legs 55, where the second openings 56b (e.g., second holes) are configured as circular holes that define a pivot axis for concentric fourth pivot members 84 to pivot (e.g., rotate) about in the second openings 56b. According to an exemplary embodiment, the carriage bracket 50 also includes a plurality of third openings 56c (e.g., third holes 56c) disposed in the second leg 55, such that each third opening 56c of the plurality of third openings 56c is configured to receive a locking element (e.g., a post, a fastener, etc.) to thereby selectively lock the device mount 20 in a predetermined position, such as a set angle of adjustment (e.g. 0°, 5°, 10°, 15°, 20°, etc.). In other words, the plurality of third openings 56c are arranged to fix the adjustment mechanism 40 in a specific position when engaged by the locking element, which in turn locks the device mount 20 in place to prohibit additional adjustment until the locking element is disengaged from the third opening 56c. As shown in FIG. 6, the locking element comprises a fastener 29d configured to lock the adjustment mechanism 40 and device mount 20 in position, as discussed below.

Also shown in FIGS. 11-23, the carriage bracket 50 includes four different third openings 56c that are arranged to selectively lock the adjustment mechanism 40 of the device mount 20 in four different positions, respectively, when engaged by the locking element. The first of the third openings 56c is configured to selectively lock the device mount 20 in a first or collapsed (e.g., non-articulated) position having 0° (zero degrees) of tilt, such that the display mounting bracket 21 is aligned substantially parallel to the support attachment bracket 30. The second of the third openings 56c is configured to selectively lock the device mount 20 in a second position having 5° (five degrees) of forward tilt, such that the display mounting bracket 21 is aligned at a 5° forward angle, relative to the support attachment bracket 30. The third of the third openings 56c is configured to selectively lock the device mount 20 in a third position having 10° (ten degrees) of forward tilt such that the display mounting bracket 21 is aligned at a 10° forward angle relative to the support attachment bracket 30. The fourth of the third openings 56c is configured to selectively lock the device mount 20 in a fourth position having 15° (fifteen degrees) of forward tilt, such that the display mounting bracket 21 is aligned at a 15° forward angle relative to the support attachment bracket 30. Although each second leg 55 of the carriage bracket 50 is shown having a plurality of third openings 56c with an opposing and symmetric arrangement, it should be noted that carriage bracket 50 may be configured to include a plurality of third openings 56c in only one second leg 55, or each leg 55 may have one or more openings that do not have an opposing and symmetric arrangement, such as having an alternating arrangement.

As shown in FIG. 6, the device mount 20 may also include a locking element that operates to selectively lock (e.g., fix) the adjustment mechanism 40 in a defined position by engaging one of the plurality of third holes 56c in the carriage bracket 50. The locking element may pass through a fourth hole 77 of the outer bracket 70a to engage one of the plurality of third holes 56c. As shown, the locking element comprises a fastener 29d (e.g., screw), where the threaded portion of the fastener 29d engages one of the plurality of third holes 56c in the second leg 55 of the carriage bracket 50. Accordingly, each third hole 56c may be a tapped hole having threads that mate with the threads of the fastener 29d. Alternatively, the fastener 29d may be a self-tapping screw that engages an unthreaded third hole 56c, or there may be a nut or other member used to retain the fastener 29d in place. The fastener 29d helps maintain the position of the adjustment mechanism 40 and the device mount 20 by prohibiting relative rotation from the fixed position between the respective outer bracket 70a, 70b and the carriage bracket 50. It should be noted that the locking element may be configured as a, post, a lock pin, or any suitable device and is not limited to fasteners.

The carriage bracket 50 may also include a locking feature 57 having a profile configured to retain a member (e.g., a post, a shaft) received therein, such as when the device mount 20 is configured in the collapsed or non-articulated position (i.e., where the display mounting bracket 21 is aligned substantially parallel to the support attachment bracket 30). The locking feature 57 may be configured to impart a retaining force onto the post when received therein, such that the retaining force must be overcome in order to articulate the display mounting bracket 21 relative to support attachment bracket 30, such as to a tilted position from the collapsed position. As shown in FIGS. 11-14, the post 88 is configured to engage the locking feature 57 to help lock the device mount 20 in the collapsed position. As shown in FIG. 23, the post 88 is integrally formed with the second pivot member 82 to reduce the number of components in the mount. However, the post 88 may be formed separately from the second pivot member 82 and still provide a locking or retaining force to help retain the device mount 20 in position, such as in the collapsed position. Moreover, the post may be configured differently than as shown in the exemplary embodiments disclosed herein. For example, the post may be configured as a fastener, a sleeve, or any suitable member that can engage a profile, such as the locking profile of the locking feature 57.

As shown, the locking feature 57 includes a first profile 57a and a second profile 57b, where one or both of the first and second profiles 57a, 57b may be configured to contact (e.g., engage, abut) the post 88. According to an exemplary embodiment, the first and second profiles 57a, 57b are defined by substantially linear and oblique surfaces that are arranged to converge to form a slot having a gradually narrowing width moving from the open end (i.e., the entrance end of the post 88) to the opposing closed end. As the post 88 travels along the converging profiles 57a, 57b, the clearance between the profiles 57a, 57b of the locking feature 57 and the outer surface of the post 88 is gradually removed. Accordingly, the locking feature 57 may be configured to have an interference fit with the post 88 at (or proximate to) the closed end, such that the post 88 is retained by the retaining force induced by the locking feature 57 at (or proximate to) the closed end. According to another exemplary embodiment, the first and second profiles 57a, 57b of the locking feature 57 are defined by offset curved surfaces, which may be non-concentric. The curved first and second profiles 57a, 57b, may be configured as cam surfaces that converge toward each other from the open end to the closed end of the locking feature 57. The curved cam profiles 57a, 57b may be configured to induce a retaining force (e.g., a biasing force, a locking force) that acts to retain the post 88 in the locking feature 57 to help maintain the device mount 20 in the collapsed or non-articulated position. The cam profiles 57a, 57b may also advantageously remove clearance, such as between the various pivot members and holes of the adjustment mechanism 40, which induces a retaining force into the device mount 20 to help maintain its position.

The inner bracket 60 comprises a U-shaped channel having opposing and offset legs 63 that extend from a base 62. The base 62 may be a solid piece that extends the length of (or shorter or longer) than the legs 63. Alternatively, the base 62 may comprise several disconnected sections (i.e., having voids located between the intermittent sections of the base 62), such as to reduce the weight of the inner bracket 60 while maintaining a relative high strength. The inner bracket 60 is configured to nest within the display mounting bracket 21, such as when the device mount 20 is in the collapsed position. The inner bracket 60 may also nest within carriage bracket 50, such as when the device mount 20 is in the collapsed position.

As shown in FIG. 20, the legs 63 of the inner bracket 60 include opposing and symmetric first holes 65 disposed at a first end of the inner bracket 60, where the first holes 65 define a pivot axis for the inner bracket 60 to move about. The first holes 65 are configured to receive the second pivot member 82, in order for the inner bracket 60 to pivot (e.g., rotate) relative to the display mounting bracket 21 through the second pivot member 82. In other words, the first end of the inner bracket 60 is pivotally coupled to the display mounting bracket 21 (e.g., the aperture 26) through the first holes 65 and the second pivot member 82 to allow relative rotation (e.g., pivoting) between the inner bracket 60 and the display mounting bracket 21 when the device mount 20 is articulated or adjusted.

The legs 63 of the inner bracket 60 also include opposing and symmetric second holes 66 disposed in a second end opposing the first end, where the second holes 66 define a pivot axis for the inner bracket 60 to move about. The second holes 66 are configured to receive the third pivot member 83, such that the inner bracket 60 is able to pivot relative to the carriage bracket 50 through the third pivot member 83. In other words, the second end of the inner bracket 60 is pivotally coupled to the carriage bracket 50 (e.g., the first opening 56a) through the second holes 66 and the third pivot member 83 to allow adjustment (e.g., pivoting) of the inner bracket 60 relative to the carriage bracket 50 when the device mount 20 is articulated or adjusted.

The legs 63 of the inner bracket 60 may also include opposing and symmetric third holes 67 disposed between the first and second ends in a central portion of the inner bracket 60. The third holes 67 define a pivot axis in which the inner bracket 60 moves about relative to the outer brackets 70a, 70b through a fifth pivot member 85 (e.g., a central pivot member). In other words, the inner bracket 60 is pivotally coupled to the outer brackets 70a, 70b through the third holes 67 and the fifth pivot member 85 to allow adjustment (e.g., rotation) of the inner bracket 60 relative to the outer brackets 70a, 70b when the device mount 20 is articulated or adjusted.

As shown, the outer brackets 70a and 70b are symmetrically opposite and accordingly only one pivot member will be discussed herein. However, it should be noted that the outer brackets 70a, 70b be configured differently. As shown in FIGS. 11-23, the outer bracket 70a comprises an L-shaped bracket having a base 72 and a leg 73 extending from the base 72 to increase the strength of the outer bracket 70a. Alternatively, the outer bracket 70a may be configured as a relatively flat plate, as shown in FIGS. 1-10, having only the base, or may be configured having any suitable shape.

The outer bracket 70a includes a first hole 74 located on a first end, a second hole 75 located on a second end opposite the first end, and a third hole 76 located between the first and second holes 74, 75. The first hole 74 is configured to receive the first pivot member 81 and thereby defines a pivot axis for the outer bracket 70a to pivot about relative to the display mounting bracket 21 through the first pivot member 81. The second hole 75 is configured to receive the fourth pivot member 84 and thereby defines a pivot axis for the outer bracket 70a to pivot about relative to the carriage bracket 50 through the fourth pivot member 84. The third hole 76 is configured to receive the fifth pivot member 85 and thereby defines a pivot axis for the outer bracket 70a to pivot about relative to the inner bracket 60 through the fifth pivot member 85.

The outer bracket 70a may also include a fourth hole 77 configured to receive the locking element and to cooperate with the third holes 56c of the carriage bracket 50 to selectively lock the device mount 20 in a preset position, such as those discussed above. As shown, the fourth hole 77 comprises a slot or elongated opening, where a portion of the slot is configured to align with one of the plurality of third holes 56c of the carriage bracket 50 when the device mount 20 is configured in various positions (e.g., collapsed, articulated or adjusted). Accordingly, the locking element (e.g., fastener 29d) may pass through the fourth hole 77 of the outer bracket 70a into the appropriate aligned hole of the plurality of third holes 56c of the carriage bracket 50 to thereby lock the device mount 20 in the position that corresponds to the respective third hole 56c.

As shown, the adjustment mechanism 40 includes five pivot members to allow for efficient articulation of the various brackets and/or members of the device mount 20. The first pivot member 81 pivotally couples the outer brackets 70a, 70b to the display mounting bracket 21 to allow for relative rotation therebetween. As shown, the first pivot member 81 has a first end that engages the first hole 74 of the outer brackets 70a, 70b and a second opposing end that engages the L-shaped slots 25 in the legs 23 of the display mounting racket 21. The first pivot member 81 is further configured to slide or otherwise move within the L-shaped opening 25 of the display mounting bracket 21 as the outer brackets 70a, 70b pivot relative to the display mounting bracket 21 during articulation or adjustment of the device mount 20. The first pivot member 81 may comprise an inner post 81a made from steel or other relatively high strength material and an outer sleeve 81b made from a polymeric material having a relatively low coefficient of friction. The outer sleeve 81b may be provided around the inner post 81a, such that the outer sleeve 81b is in direct contact with the L-shaped opening 25 to provide for efficient (e.g., with relative low force) translation or travel of the first pivot member 81 in the slot 25 of the display mounting bracket 21 during articulation of the device mount 20.

The second pivot member 82 pivotally couples the display mounting bracket 21 to the inner bracket 60 to allow relative rotation therebetween. As shown in FIG. 23, the second pivot member 82 includes an inner shaft 82a (e.g., a body 82a), preferable made from steel or any suitable material having a relative high strength (e.g., shear strength), and two sleeves 82b, such that each sleeve 82b is disposed around a portion of the shaft 82a and located between one leg 23 of the display mounting bracket 21 and one leg 63 of the inner bracket 60 to allow for efficient relative rotation between the display mounting bracket 21 and the inner bracket 60. The shaft 82a of the second pivot member 82 extends through the holes 65 in the legs 63 of the inner bracket 60 and may also extend through the holes 26 in the legs 23 in the display mounting bracket 21, such as to form the post 88 when integrally formed.

The third pivot member 83 pivotally couples the carriage bracket 50 to the inner bracket 60 to allow relative rotation therebetween. As shown, the third pivot member 83 includes a body, a first shoulder, and a second shoulder that extends from the body from an opposing side. The first shoulder of the third pivot member 83 is coupled to the inner bracket 60, and the second shoulder is configured to travel (e.g., translate) in the first slot 56a of the carriage bracket 50. The third pivot member 83 may include a third shoulder that extends from the second shoulder, where the third shoulder has a larger diameter, than the width of the first slot 56a to thereby movably couple the third pivot member 83 to the carriage bracket 50. The third shoulder may be formed by pressing the second shoulder through staking, spinning, or any suitable method. The third pivot member 83 may include a washer disposed between the third shoulder and the adjacent leg 53 of the carriage bracket 50 to allow the third pivot member 83 to slide or otherwise shift relative to the carriage bracket 50 in an efficient manner. In other words, the third pivot member 83 is movably coupled to the carriage bracket 50 and allows the inner bracket 60 to pivot relative to the carriage bracket 50.

The fourth pivot member 84 pivotally couples the carriage bracket 50 to one of (or both) the outer brackets 70a, 70b to allow relative rotation therebetween. As shown, the fourth pivot member 84 includes a body and a head having a larger diameter than the body. The head is disposed outboard of the respective outer bracket 70a, 70b and the body extends from the head through the second hole 75 of the outer bracket 70a, 70b and through the second hole 56b of the carriage bracket 50 to pivotally couple the outer bracket 70a, 70b and the carriage bracket 50. The body may include a shoulder that has a larger diameter relative to the second hole 56b of the carriage bracket 50 to pivotally couple the fourth pivot member 84 to the carriage bracket 50, where the shoulder may be formed by pressing the body through staking, spinning, or by any suitable method. The fourth pivot member 84 may also include one or more washers to allow relative rotation with higher efficiency. For example, the fourth pivot member 84 may include a first washer disposed between the head and the outer bracket 70a, 70b and a second washer disposed between the outer bracket 70a, 70b and the carriage bracket 50.

The fifth pivot member 85 (e.g., central pivot member) pivotally couples the outer brackets 70a, 70b to the inner bracket 60 to allow relative rotation therebetween. As shown, the fifth pivot member 85 includes a head that is disposed outboard of the respective outer bracket 70a, 70b and a body that extends through the third holes 76 of the outer brackets 70a, 70b and through the holes 67 in the inner bracket 60 to pivotally couple the outer brackets 70a, 70b to the inner bracket 60. In other words, the U-shaped inner bracket 60 forms a clevis with the body of the fifth pivot member 85 passing through the holes 67 therein, and the two spaced apart outer brackets 70a, 70b operate like a clevis with the shaft of the fifth pivot member 85 also passing through the third holes 76 therein.

It should be noted that the various pivot members (e.g., first through fifth pivot members) disclosed herein may be configured differently than disclosed herein and the examples disclosed herein are, not, meant as limitations. For example, the various pivot members may be configured as bushings, bearings, or configured having any suitable configuration that allows for efficient relative rotation between two or more members.

Figures 9A, 9B:
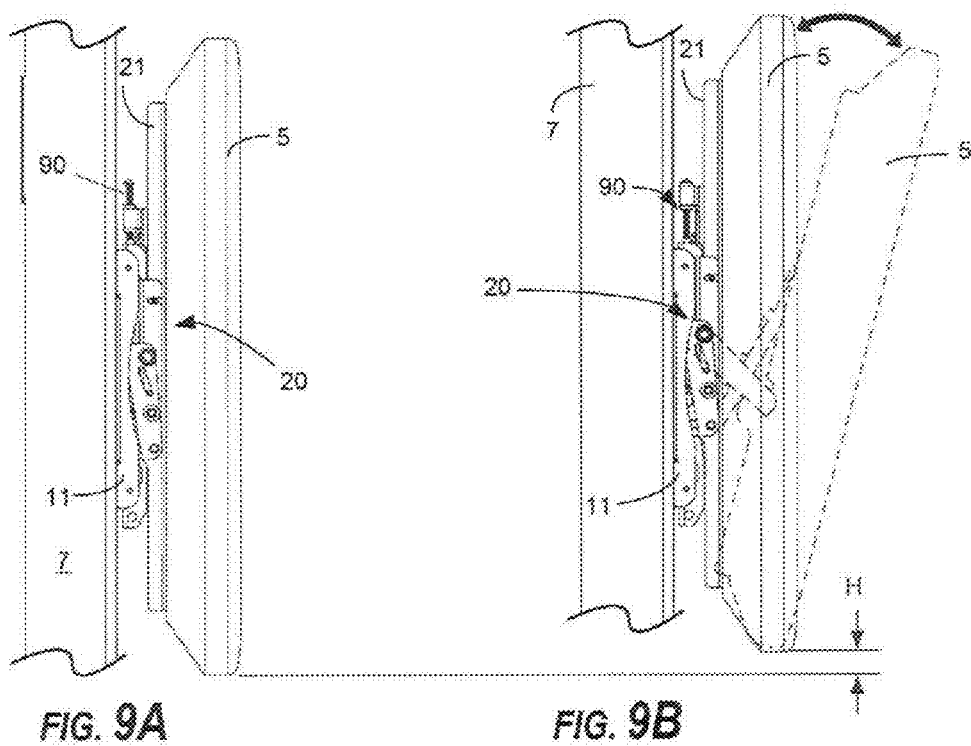
FIGS. 9A and 9B are side views of the mounting assembly of FIG. 1 supporting a display device and coupled to a wall, showing the height adjustment of the display device relative to the wall through adjustment of the device mount.

The device mount 20 may further include a fine adjustment assembly 90 that is configured to allow for linear adjustment of the carriage bracket 50 relative to the support attachment bracket 30. The fine adjustment assembly 90 may provide linear adjustment (e.g., fine adjustment) of the display mounting bracket 21 through the adjustment mechanism 40 having the carriage bracket 50, such as to level the display device 5 coupled to the display mounting bracket 21 by adjusting one device mount 20 relative to another device mount 20, as shown in FIGS. 9a and 9b.

FIG. 12-16 illustrate an exemplary embodiment of the fine adjustment assembly 90 that includes a contact member 38, a retaining member 58, and an adjustable member, such as a fastener 29c (e.g., a screw). As shown, the contact member 38 comprises an ear (e.g., a flange) formed from the support attachment bracket 30, where the contact member 38 is configured to be engaged by the fastener 29c. The retaining member 58 is configured to retain the fastener 29c, while allowing for the fastener 29c to be adjusted (e.g., rotated) relative to the retaining member 58. As shown, the retaining member 58 is integrally formed with the carriage bracket 50 and includes two spaced apart and opposing flanges 58a, where each flange 58a includes a threaded hole therein to receive the threads of the fastener 29c. The retaining member 58 may include one flange 58a or a plurality of flanges 58a having threads configured to receive the threads of the fastener 29c when the fastener 29c engages (e.g., is pivotally coupled to) the retaining member 58, or each flange 58a may have a through hole therein, such as to receive a self-tapping fastener (e.g., screw) therethrough.

Accordingly, when a driving end of the fastener 29c is adjusted, such as by an instrument (e.g., a screwdriver), the fastener 29c rotates relative to the retaining member 58 moving a driven end of the fastener 29c toward or away from the contact member 38 of the support attachment bracket 30 depending on the direction (e.g., clockwise, counter-clockwise) the fastener 29c is rotated. The driven end of the fastener 29c may come into contact with an external surface of the contact member 38, whereby additional rotation of the fastener 29c induces a force into the external surface that drives (e.g., moves) the contact member 38 and the support attachment bracket 30 away from the retaining member 58 of the carriage bracket 50. Accordingly, when the force from the fastener 29c of the fine adjustment assembly 90 overcomes the clamping force imparted from the fasteners 29b that movably couple the support attachment bracket 30 and the carriage bracket 50, the support attachment bracket 30 moves relative to the carriage bracket 50.

The fine adjustment assembly 90 of the device mount 20 may allow for leveling of one device mount 20 relative to another device mount 20 of the mounting assembly 10, such as to level the display device 5 coupled to the mounting assembly 10. Additionally, the display device 5 may be adjusted linearly (e.g., vertical height) relative to the wall 7, through adjustment of the one or more linear adjustment assemblies 90 of the one or more device mounts 20. As shown in FIGS. 9A and 9B, the height of the display device 5 may be adjusted (e.g., upwardly, downwardly) a predetermined height H relative to the wall 7 (and support attachment bracket 30) through the manipulation or adjustment of the fine adjustment assembly 90, such as after the coupled display device 5 and mounting assembly 10 have been mounted to the wall 7. Thus, the device mount 20 may provide for relatively fine linear adjustment between the support attachment bracket 30 and the carriage bracket 50 through the fine adjustment assembly 90, and the device mount 20 may provide for relatively course linear adjustment between the support attachment bracket 30 and the carriage bracket 50 by loosening the fasteners 29b that selectively clamp the support attachment bracket 30 and carriage bracket 50 together. In addition, the device mount 20 may be articulated, such as to adjust the tilt of the display device 5, after being adjusted linearly up or down (e.g., leveled), as shown in FIG. 9B, where the display device 5' (shown as dashed lines) represents a tilted position of the display device 5.

FIGS. 24-30 illustrate another exemplary embodiment of a device mount 120 that is configured to provide linear (e.g., height) adjustment of the display device (e.g., flat screen display device) coupled thereto, relative to a fixing member, such as a wall. As shown, the device mount 120 includes a display mounting bracket 121 and a support attachment bracket 130 that is configured to attach (e.g., couple, mount) to a surface mounting member (e.g., the surface mounting member 11).

As shown, the display mounting bracket 121 comprises a U-shaped channel having a base 122 and spaced-apart opposing legs 123 (e.g., flanges) extending from the base 122. The base 122 of the display mounting bracket 121 is configured to support the display device coupled thereto. Accordingly, the base 122 of the display mounting bracket 121 includes a plurality of slots 124 (e.g., apertures) that are configured to receive one or more fasteners (e.g., bolts, screws, etc.) for mounting or coupling the display device to the display mounting bracket 121. Each leg 123 of the display mounting bracket 121 includes one or more slots 125 configured to oppose symmetric slots 125 in the other leg 123, where each slot 125 is configured to receive a fastener 129b. The slots 125 are configured to allow relative motion (e.g., linear motion) between the display mounting bracket 121 and the supply attachment bracket 130.

As shown, the support attachment bracket 130 comprises a U-shaped channel having a base 132 and opposing legs 133 (e.g., flanges) extending from the base 132. The base 132 of the support attachment bracket 130 is configured to operatively connect (e.g., couple, attach, engage) to a surface mounting member to support a display device (e.g., the display device 5) coupled to the device mount 120. The support attachment bracket 130 includes features for coupling the support attachment bracket 130 to the surface mounting bracket. As shown, the support attachment bracket 130 includes notches 134 that cut into the base 132 and the legs 133 that define engaging features 135 for operatively connecting to the surface mounting member. The first notch 134a (e.g., the top notch) includes a rectangular portion and an undercut trapezoidal portion that defines a first engaging feature 135a having a recess, such as described above. The second notch 134b (e.g., the bottom notch) includes a rectangular portion that defines a second engaging feature 135b, such as described above.

The support attachment bracket 130 may also include a retaining member to help maintain engagement between the second engaging feature 135b of the support attachment bracket 130 and the surface mounting member (e.g., a lower receiving feature). In other words, the retaining member is configured to help lock the support attachment bracket 130 to the surface mounting member. As shown, the retaining member may include a fastener 129a (e.g., screw) in threaded engagement with a tab 136 (e.g., an ear) having a threaded hole therein. After the engaging features of the support attachment bracket 130 and the respective receiving features of the surface mounting member 11 are engaged, the fastener 129a may be tightened (e.g., turned) to thereby move an end of the fastener 129a into a clamping condition with surface mounting member and/or create an interference with the receiving feature of the surface mounting member 11, such as described above.

The support attachment bracket 130 also includes one or more openings 137 (e.g., slots, holes) configured to allow relative movement (e.g., sliding) between the support attachment bracket 130 and the display mounting bracket 121. As shown, each leg 133 of the support attachment bracket 130 includes two aligned slots 137, where each slot 137 is arranged opposing another slot 137 in the opposing leg 133. Each leg 133 receives a fastener 129b for selectively damping the support attachment bracket 130 to the display mounting bracket 121 to prevent relative movement between the support attachment bracket 30 and the display mounting bracket 121. Accordingly, the one or more fasteners 129b may be loosened to allow relative movement (e.g., linear travel) between the display mounting bracket 121 and the support attachment bracket 130 to provide adjustment of the device mount 120.

The device mount 20, 120 also includes a fine adjustment assembly 90, 190 that is configured to selectively shift the display mounting bracket 21, 121 relative to the support attachment bracket 30, 130. For example, the fine adjustment assembly 190 may provide linear adjustment of the display mounting bracket 121 relative to the support attachment bracket 130. However, it should be noted that the fine adjustment assembly 190 may also be configured to shift the display mounting bracket 121 along a non-linear path, such as an arcuate path, relative to the support attachment bracket 130 to provide the selective shift.

According to an exemplary embodiment, the fine adjustment assembly 90 includes an adjustment member 29c, a retaining member 58 configured to pivotally support the adjustment member 29c, and a contact member 38 having an external surface that is configured to be contacted by the adjustment member. As shown in FIG. 12, the adjustment member 29c comprises a fastener, however, it should be noted that the adjustment member 29c may be configured differently than as disclosed herein. Rotation of the adjustment member 29c when the adjustment member 29c contacts the external surface of the contact member 38 moves the contact member 38 relative to the retaining member 58, thereby shifting or adjusting the position of the display mounting bracket 21 relative to the support attachment bracket 30. As shown, the retaining member 58 is integrally formed with the support attachment bracket 30 and the contact member 38 is part of the adjustment mechanism 40. However, it should be noted, that the retaining member 58 may also be part of the display mounting bracket 21 or the adjustment mechanism 40, where the contact member 38 would be part of another one of the support attachment bracket 30 and the adjustment mechanism 40.

According to another exemplary embodiment, fine adjustment assembly 190 includes an adjustment member 129c, a retaining member 128 configured to pivotally support the adjustment member 129c, and a contact member 138 having an external surface that is configured to be contacted by the adjustment member. As shown in FIG. 24, the adjustment member 129c comprises a fastener 129c, and the support attachment bracket 130 includes the contact member 138 having the external surface that is configured to be contacted or engaged by the fastener 129c, such as an end of the fastener opposite an adjusting end, where the fastener 129c is rotationally supported by the retaining member 128 of the display mounting bracket 121. As shown in FIG. 24, the contact member 138 is integrally formed with the support attachment bracket 130 and comprises an L-shaped flange or extension that extends away from a leg 133 of the support attachment bracket 130, where the contact member 138 includes the external surface extending substantially perpendicular to the adjacent leg 133 of the support attachment bracket 130. The external surface of the contact member 138 may be selectively contacted by the end of the adjustment member when the position of the device mount 120 is being adjusted. However, the contact member 138 may be formed separately from the support attachment bracket 130 and coupled thereto. As shown, the retaining member 128 is integrally formed with the display mounting bracket 121 and comprises a U-shaped flange or extension (e.g., an inverted U-shaped flange) that extends away from a leg 123 of the display mounting bracket 121, where one or both of the opposing walls of the U-shaped extension may pivotally support the fastener 129c therein, such as by a threaded hole. However, the retaining member 128 may be formed separately from the display mounting bracket 121 and coupled thereto. The fine adjustment assembly 190 may also be configured differently than shown. For example, the contact member may be configured on the display mounting bracket and the retaining member may be configured on the support attachment bracket. The fine adjustment assembly 190 may also be configured as described above.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the mounting systems and device mounts as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A mounting system for attaching an audio/visual device to a surface via a surface mounting member, the mounting system comprising:
a support attachment bracket operatively connected to the surface mounting member;
a display mounting bracket operatively connected to the audio/visual device; and
an adjustment mechanism operatively connecting the display mounting bracket and the support attachment bracket, the adjustment mechanism articulating the display mounting bracket relative to the support attachment bracket through a pivot member when the support attachment bracket is connected to the surface mounting member, the adjustment mechanism including an outer bracket and an inner bracket, the outer bracket having an outer bracket first end pivotally coupled to the pivot member and an outer bracket second end pivotally coupled to the support attachment bracket, the inner bracket having an inner bracket first end pivotally coupled to the display mounting bracket and an inner bracket second end slidably and pivotally coupled to the support attachment bracket;
wherein the display mounting bracket includes a guide feature that is movably coupled to the pivot member and the adjustment mechanism is pivotally coupled to the pivot member;
wherein the guide feature includes a first leg to allow for forward tilt of the display mounting bracket relative to the support attachment bracket when the pivot member engages the first leg; and
wherein the guide feature includes a second leg to allow for rearward tilt of the display mounting bracket relative to the support attachment bracket when the pivot member engages the second leg.

2. The mounting system of claim 1, wherein the first leg of the guide feature is at an angle relative to the second leg.

3. The mounting system of claim 2, wherein the guide feature comprises an opening, with the first leg at an acute angle relative to the second leg.

4. The mounting system of claim 2, wherein the first leg of the guide feature is substantially parallel to a surface of the display mounting bracket that is operatively connected to the audio/visual device.

5. The mounting system of claim 1, wherein the display mounting bracket includes a base that operatively connects to the audio/visual device and a wall that extends from the base, the wall having the guide feature therein.

6. The mounting system of claim 1, further comprising a second pivot member pivotally coupling the inner bracket and the display mounting bracket, a third pivot member pivotally and slidably coupling the inner bracket and the support attachment bracket, and a fourth pivot member pivotally coupling the outer bracket and the support attachment bracket, wherein the first pivot member includes an inner post and an outer sleeve disposed around the inner post.

7. A mounting system for attaching an audio/visual device to a surface via a surface mounting member, the mounting system comprising:
a support attachment bracket operatively connected to the surface mounting member;
a display mounting bracket that selectively shifts relative to the support attachment bracket, wherein the display mounting bracket operatively connects to the audio/visual device; and
an adjustment assembly including:
an adjustment member;
a retaining member that pivotally supports the adjustment member; and
a contact member having an external surface selectively contacted by an end of the adjustment member;
wherein rotation of the adjustment member relative to the retaining member when an end of the adjustment member contacts the external surface of the contact member moves the contact member relative to the retaining member, thereby adjusting translating the position of the display mounting bracket relative to the support attachment bracket.

8. The mounting system of claim 7, wherein the adjustment member comprises a threaded fastener.

9. The mounting system of claim 8, wherein the retaining member comprises a U-shaped cross-section with spaced apart and opposing side walls with each of the opposing side walls including an opening therein, and wherein the threaded fastener is sized to rotate within the opening so as to selectively adjust the position of the display mounting bracket relative to the support attachment bracket.

10. The mounting system of claim 7, wherein the retaining member is integrally formed with one of the display mounting bracket and the support attachment bracket.

11. The mounting system of claim 10, wherein the contact member is integrally formed with the other of the display mounting bracket and the support attachment bracket.

12. The mounting system of claim 7, wherein the contact member comprises an L-shaped flange formed from a leg of the support attachment bracket.

* * * * *

UNITED STATES PATENT AND TRADEMARK OFFICE
CERTIFICATE OF CORRECTION

| | |
|---|---|
| PATENT NO. | : 8,746,642 B2 |
| APPLICATION NO. | : 13/397506 |
| DATED | : June 10, 2014 |
| INVENTOR(S) | : Daniel E. Molter |

It is certified that error appears in the above-identified patent and that said Letters Patent is hereby corrected as shown below:

In the Claims

Column 18, Claim 7, Line 36 "adjusting" should be deleted.

Signed and Sealed this
Eleventh Day of November, 2014

Michelle K. Lee
*Deputy Director of the United States Patent and Trademark Office*